(12) United States Patent
Park et al.

(10) Patent No.: US 11,399,143 B2
(45) Date of Patent: Jul. 26, 2022

(54) ARTIFICIAL INTELLIGENCE DISPLAY DEVICE

(71) Applicant: LG ELECTRONICS INC., Seoul (KR)

(72) Inventors: Chanyong Park, Seoul (KR); Yunsuk Kang, Seoul (KR); Wonseok Kang, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/939,017

(22) Filed: Jul. 26, 2020

(65) Prior Publication Data

US 2021/0243386 A1    Aug. 5, 2021

(30) Foreign Application Priority Data

Jan. 31, 2020  (KR) .......................... 10-2020-0011739

(51) Int. Cl.
*H04N 5/262*    (2006.01)
*H04N 5/265*    (2006.01)
(Continued)

(52) U.S. Cl.
CPC ............ *H04N 5/2628* (2013.01); *G06V 20/52* (2022.01); *H04N 5/247* (2013.01); *H04N 5/265* (2013.01); *H04N 7/181* (2013.01)

(58) Field of Classification Search
CPC ...... H04N 5/2628; H04N 5/247; H04N 5/265; H04N 7/181; H04N 5/23238; H04N 19/87; G06V 20/52; G06T 5/001; G06T 5/50
See application file for complete search history.

(56) References Cited

U.S. PATENT DOCUMENTS 8,049,786 B2    11/2011  Pan et al.
9,776,566 B2 *  10/2017  Ishimoto ................. E02F 9/262
(Continued)

FOREIGN PATENT DOCUMENTS

JP        2012257004      12/2012
KR    10-2011-0023468      3/2011
(Continued)

OTHER PUBLICATIONS

Korean Intellectual Property Office Application Serial No. 10-2020-0011739, Notice of Allowance dated Apr. 28, 2021, 6 pages.

(Continued)

*Primary Examiner* — John W Miller
*Assistant Examiner* — Humam M Satti
(74) *Attorney, Agent, or Firm* — Lee Hong Degerman Kang & Waimey

(57) ABSTRACT

An artificial intelligence display device is disclosed. The artificial intelligence display device includes a display, and a processor configured to generate a monitoring image by using a plurality of images captured by a plurality of cameras, respectively, and control the display to display the monitoring image, in which the plurality of images includes a first image and a second image adjacent to the first image, and the processor is configured to generate a first corrected image obtained by compressing a first overlapped region overlapping the second image in the first image, generate a second corrected image obtained by compressing a second overlapped region overlapping the first image in the second image, and connect the first corrected image and the second corrected image.

13 Claims, 20 Drawing Sheets

(51) Int. Cl.
*H04N 7/18* (2006.01)
*H04N 5/247* (2006.01)
*G06V 20/52* (2022.01)

(56) References Cited

U.S. PATENT DOCUMENTS

| | | | |
|---|---|---|---|
| 2004/0145658 A1* | 7/2004 | Lev-Ran | G08B 13/19656 348/143 |
| 2011/0013836 A1* | 1/2011 | Gefen | H04N 9/68 382/171 |
| 2012/0169842 A1* | 7/2012 | Chuang | G08B 13/19619 348/39 |
| 2012/0314072 A1 | 12/2012 | Kiyo et al. | |
| 2014/0028851 A1* | 1/2014 | Shan | H04N 7/181 348/E7.085 |
| 2016/0050368 A1 | 2/2016 | Seo et al. | |
| 2017/0064203 A1* | 3/2017 | Kikuta | G06T 3/4038 |
| 2018/0007263 A1* | 1/2018 | Vandrotti | G06K 9/4609 |
| 2019/0354003 A1* | 11/2019 | Ise | H04N 5/247 |
| 2019/0377940 A1* | 12/2019 | Banerjee | G06V 10/273 |
| 2020/0237229 A1* | 7/2020 | Fei | G06T 7/0012 |

FOREIGN PATENT DOCUMENTS

| | | |
|---|---|---|
| KR | 10-2016-0021501 | 2/2016 |
| KR | 10-2017-0124424 | 11/2017 |

OTHER PUBLICATIONS

Korean Intellectual Property Office Application No. 10-2020-0011739, Office Action dated Oct. 26, 2020, 7 pages.
Bae et al., "A Study on Detecting Moving Objects using Multiple Fisheye Cameras", Journal of the Institute of Electronics and Information Engineers, vol. 45, No. 4, pp. 32-40, Jul. 2008, 9 pages.

* cited by examiner

FIG. 6
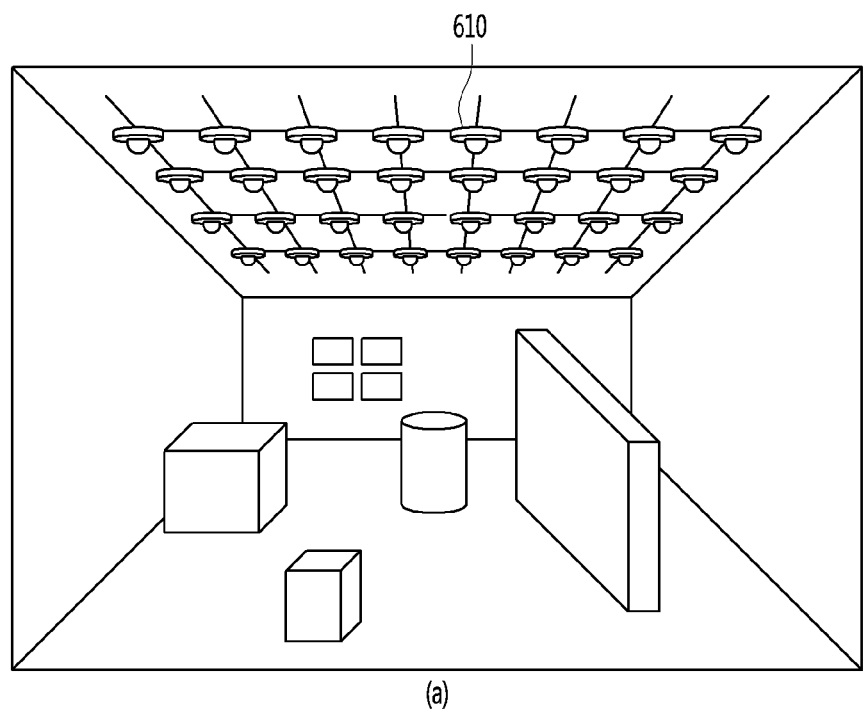
(a)
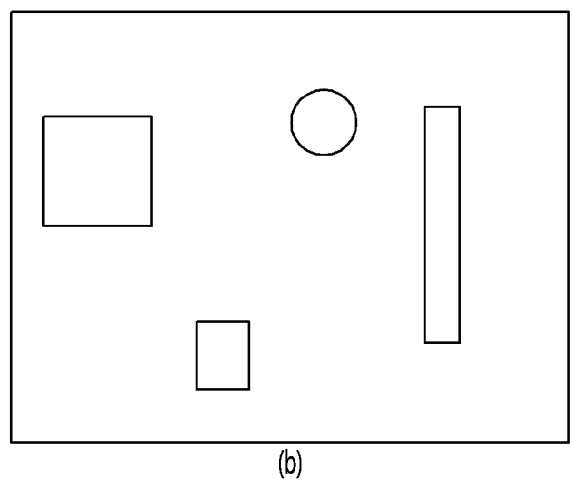
(b)

FIG. 7
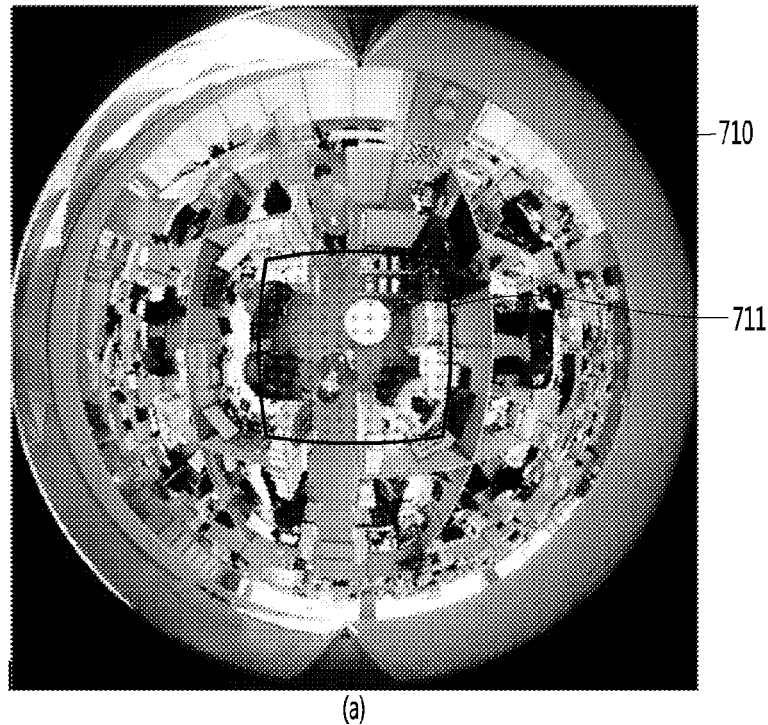
(a)
(b)

FIG. 8
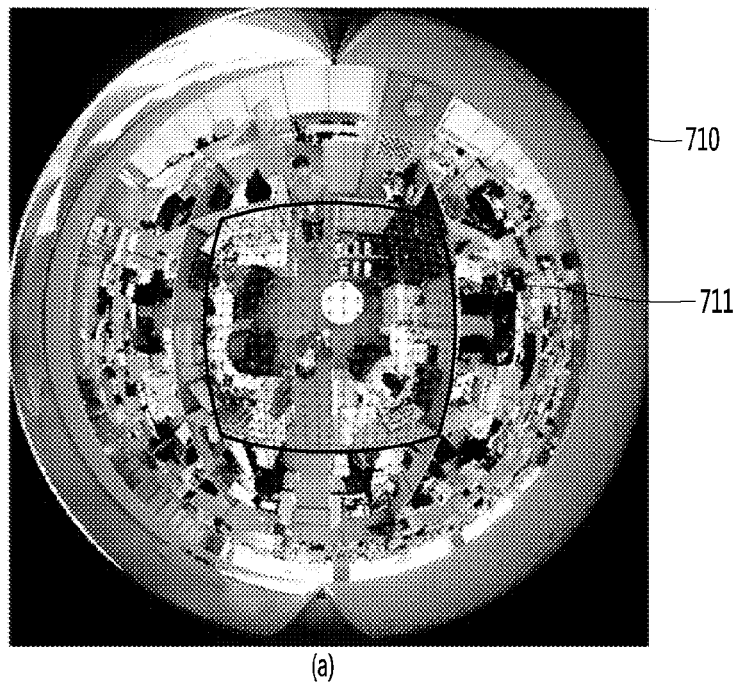
(a)
(b)

FIG. 9
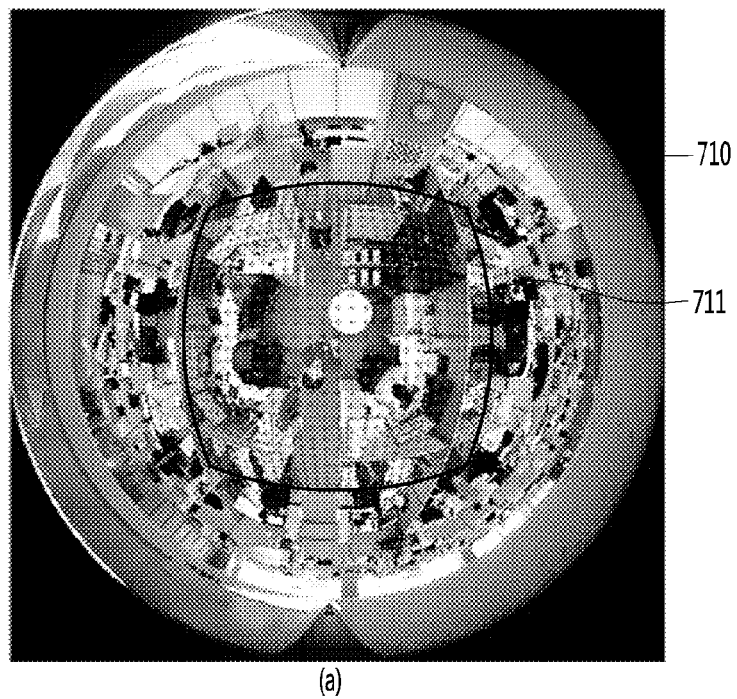
(a)
(b)

FIG. 10
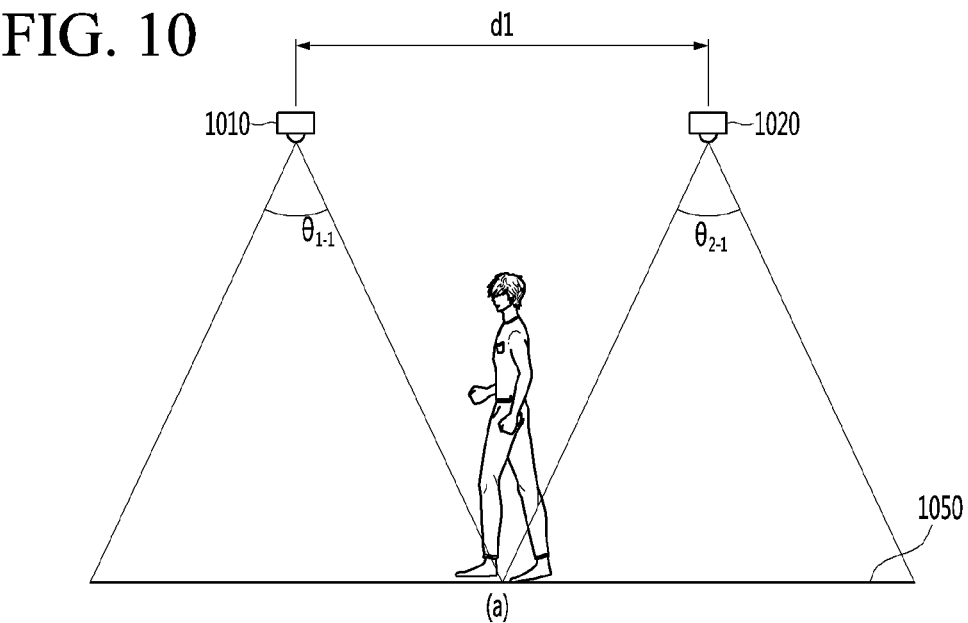
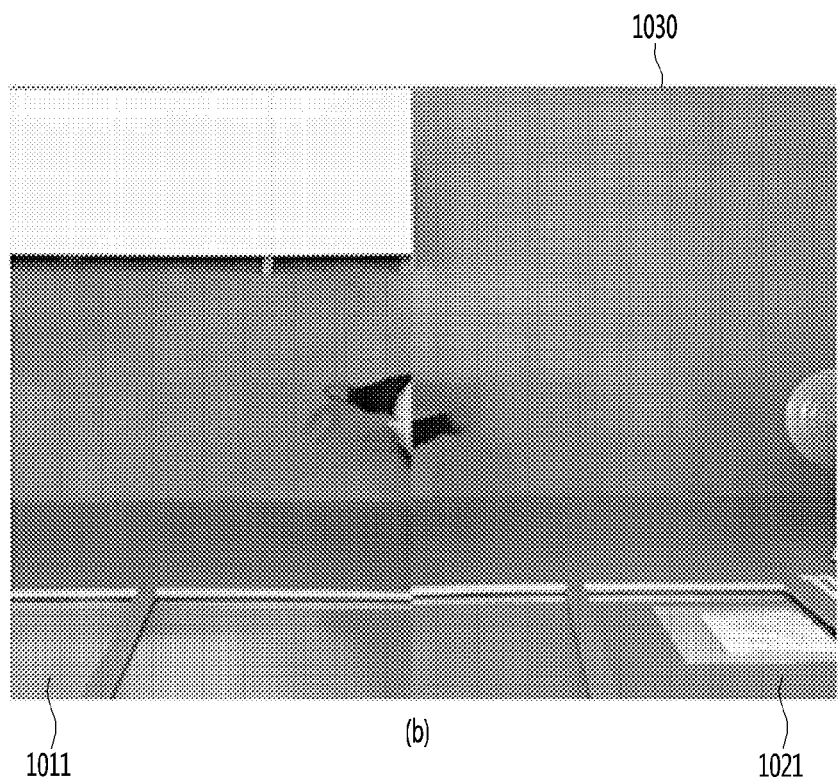

FIG. 11
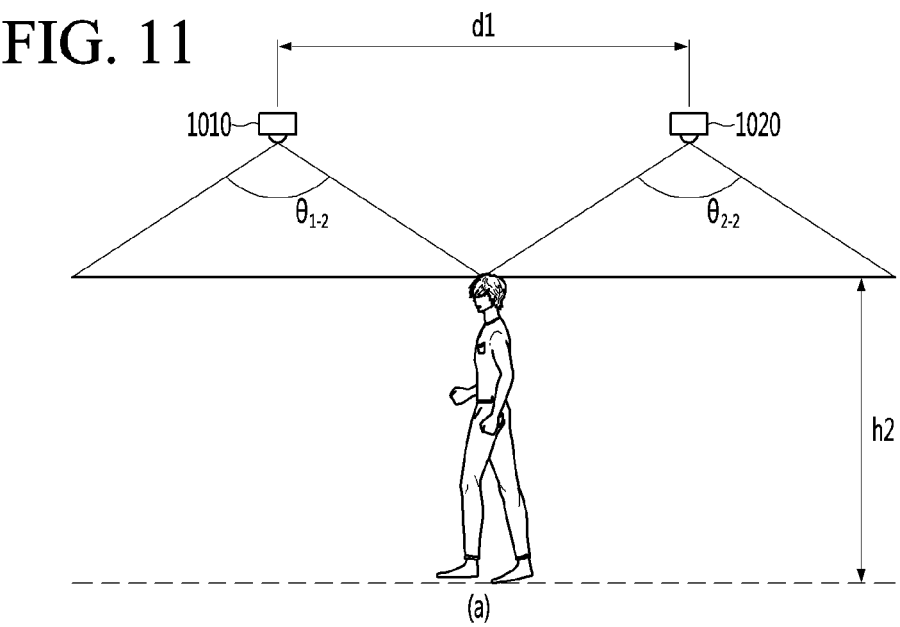
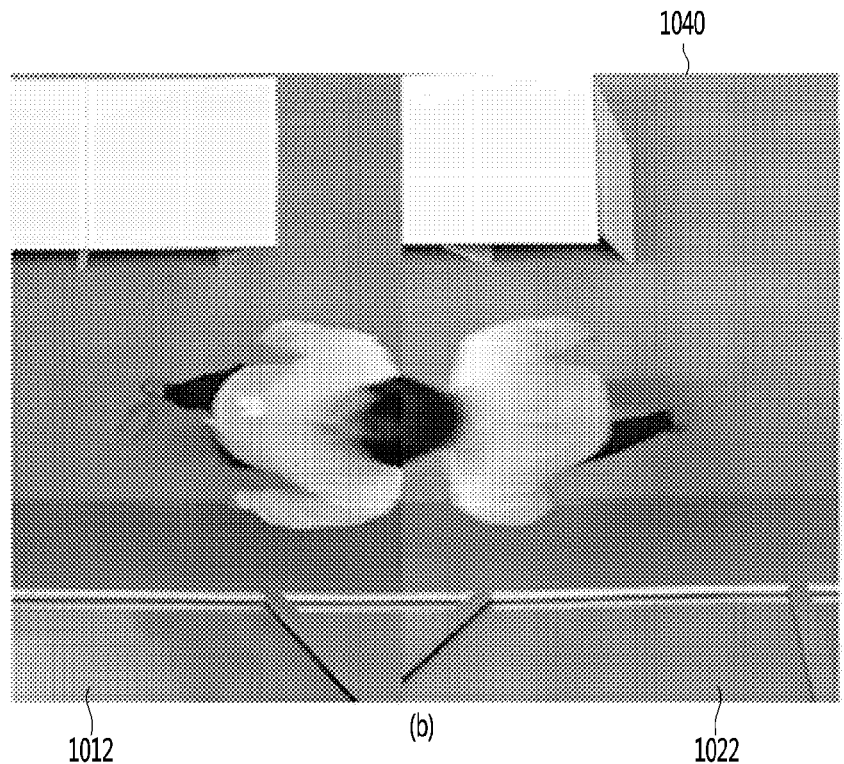

FIG. 14
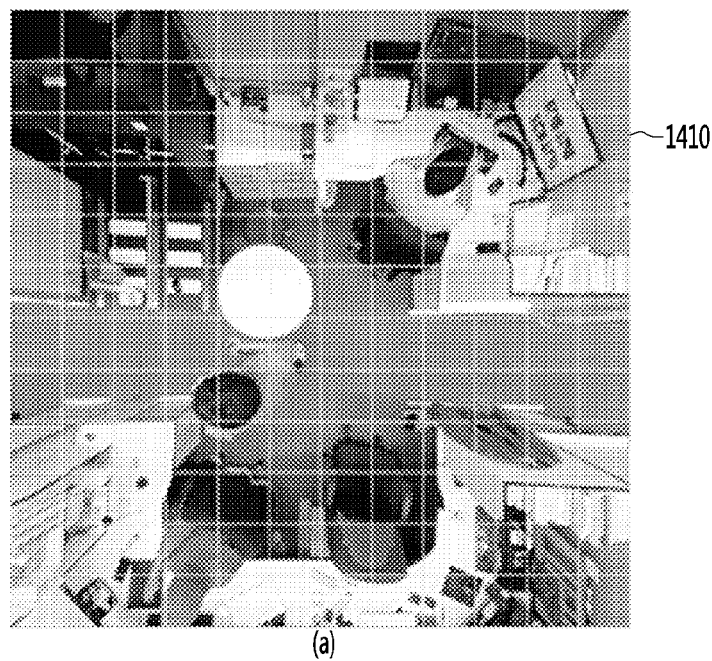
(a)
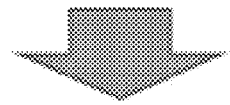
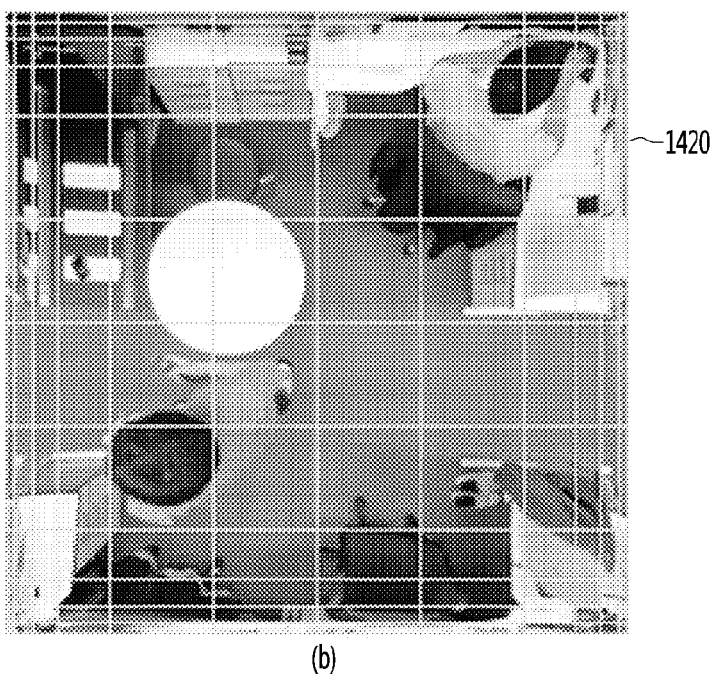
(b)

(a)

(b)

ARTIFICIAL INTELLIGENCE DISPLAY DEVICE

CROSS-REFERENCE TO RELATED APPLICATIONS

Pursuant to 35 U.S.C. § 119(a), this application claims the benefit of earlier filing date and right of priority to Korean Patent Application No. 10-2020-0011739, filed on Jan. 31, 2020, the contents of which are hereby incorporated by reference herein in its entirety.

BACKGROUND

The present disclosure relates to an artificial intelligence display device that can reduce distortion generated in an object of an image boundary by compressing an edge when a plurality of images are stitched to generate one image.

Artificial intelligence, which means that computers can imitate a human intelligence, is a field of computer engineering and information technology that studies a method for allowing the computers to think, learn, self-develop, and the like that can be performed by the human intelligence. Further, the artificial intelligence does not exist by itself, but is directly or indirectly related to other fields of computer science. Particularly in the modern age, attempts to introduce artificial intelligence elements in various fields of information technology and to utilize the artificial intelligence elements in solving problems in the field are being actively carried out.

In an example, a technology that uses the artificial intelligence to recognize and learn an ambient situation, provides information desired by a user in a desired form, or performs an operation or a function desired by the user is being actively researched. Further, an electronic device providing such various operations and functions may be referred to as an artificial intelligence device.

Recently, a case where the monitoring of the inside is performed by installing a CCTV in the indoor space is increasing. Especially, in unmanned stores, it is very important to know the number of customers, the movement situation, the movement pattern, or the like.

SUMMARY

An objective of the present disclosure is to provide an artificial intelligence display device that can reduce distortion generated in an object of an image boundary by compressing an edge when a plurality of images are stitched to generate one image.

An artificial intelligence display device includes a display, and a processor configured to generate a monitoring image by using a plurality of images captured by a plurality of cameras, respectively, and control the display to display the monitoring image, in which the plurality of images includes a first image and a second image adjacent to the first image, and the processor is configured to generate a first corrected image obtained by compressing a first overlapped region overlapping the second image in the first image, generate a second corrected image obtained by compressing a second overlapped region overlapping the first image in the second image, and connect the first corrected image and the second corrected image.

According to the present disclosure, an object may be naturally expressed at the boundary between images, and the performance of object tracking may be improved.

BRIEF DESCRIPTION OF THE DRAWINGS

FIG. 6 is a view for explaining a camera disposition according to the present disclosure.

FIG. 7 is a view for describing a first full image captured by a first camera of a plurality of cameras and a first image obtained by cutting a partial region of the first full image.

FIG. 8 is an image captured by the first camera when the cameras have an interval of 3 m*3 m.

FIG. 9 is an image captured by the first camera when the cameras have an interval of 4 m*4 m.

FIGS. 10 to 11 are views for describing a reference height as a reference for extracting a first image and a second image.

FIG. 14 is a view illustrating a first image and a first corrected image obtained by compressing a first overlapped region in a first image.

DETAILED DESCRIPTION OF THE EMBODIMENTS

Figure 1:
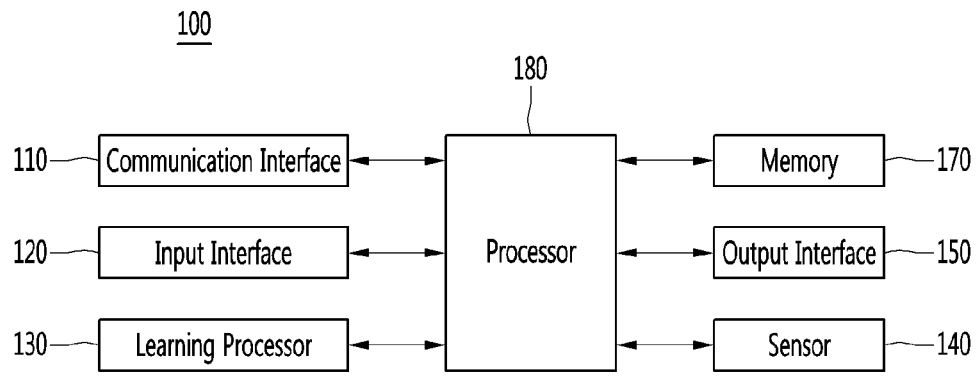
FIG. 1 illustrates an AI device 100 according to an embodiment of the present disclosure.

Hereinafter, embodiments of the present invention are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present invention is not limited thereto. It should be understood that all of variations, equivalents or substitutes contained in the concept and technical scope of the present invention are also included.

It will be understood that the terms "first" and "second" are used herein to describe various components but these components should not be limited by these terms. These terms are used only to distinguish one component from other components. In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network. Machine learning may be classified into supervised learning, unsupervised learning, and reinforcement learning according to a learning method.

The supervised learning refers to a method of learning an artificial neural network when a label for learning data is given, and the label may mean the correct answer (or result value) that the artificial neural network must infer when the learning data is input to the artificial neural network. The unsupervised learning refers to a method of learning an artificial neural network when a label for learning data is not given. The reinforcement learning refers to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep running is part of machine running. In the following, machine learning is used to mean deep running.

<Robot>

A robot refers to a machine that automatically processes or operates a given task by its own ability. In particular, a robot having a function of recognizing an environment and performing a self-determination operation may be referred to as an intelligent robot. Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving>

Self-driving refers to a technique of driving for oneself, and a self-driving vehicle refers to a vehicle that travels without an operation of a user or with a minimum operation of a user. For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like. At this time, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 illustrates an AI device 100 according to an embodiment of the present invention. The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180. The communication unit 110 can transmit and receive data to and from external devices such as other AI devices 100a to 100e and the AI server 200 by using wire/wireless communication technology. For example, the communication unit 110 can transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 can acquire various kinds of data. Further, the input unit 120 may include a camera for inputting a video signal, a microphone for receiving an audio signal, and a user input unit for receiving information from a user. The camera or the microphone may be treated as a sensor, and the signal acquired from the camera or the microphone can be referred to as sensing data or sensor information.

The input unit 120 can acquire a learning data for model learning and an input data to be used when an output is acquired by using learning model. The input unit 120 can acquire raw input data. In this case, the processor 180 or the learning processor 130 can extract an input feature by preprocessing the input data.

In addition, the learning processor 130 can learn a model composed of an artificial neural network by using learning data. The learned artificial neural network can be referred to as a learning model. The learning model can be used to an infer result value for new input data rather than learning data, and the inferred value can be used as a basis for determination to perform a certain operation.

Figure 2:
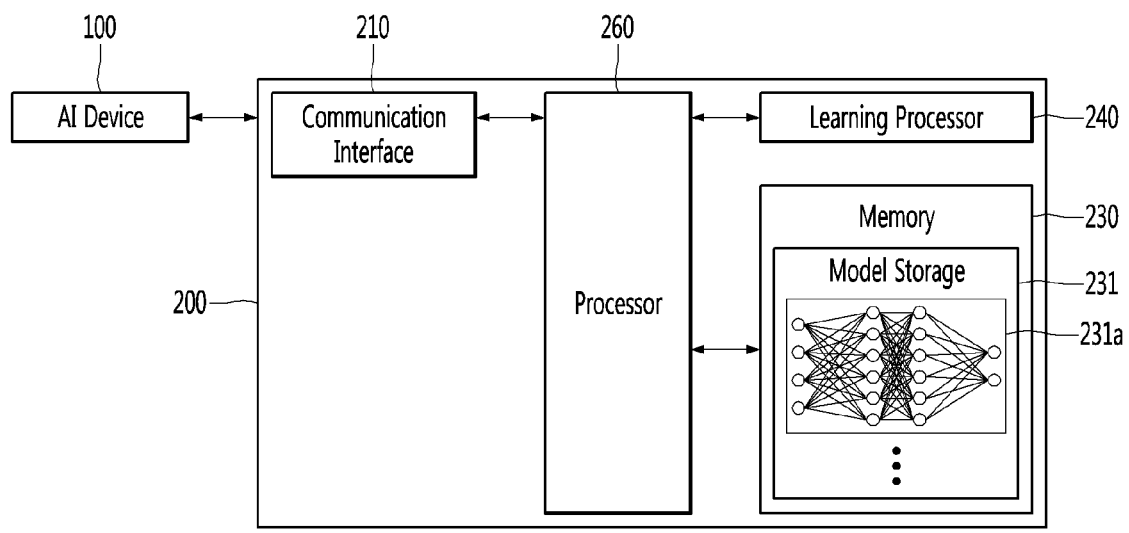
FIG. 2 illustrates an AI server 200 according to an embodiment of the present disclosure.

Further, the learning processor 130 can perform AI processing together with the learning processor 240 of the AI server 200 (FIG. 2). Further, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 can acquire at least one of internal information about the AI device 100, ambient environment information about the AI device 100, and user information by using various sensors. Examples of the sensors included in the sensing unit 140 include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

In addition, the output unit 150 can generate an output related to a visual sense, an auditory sense, or a haptic sense. Further, the output unit 150 may include a display unit for outputting time information, a speaker for outputting auditory information, and a haptic module for outputting haptic information.

The memory 170 can store data that supports various functions of the AI device 100. For example, the memory 170 can store input data acquired by the input unit 120, learning data, a learning model, a learning history, and the like. Also, the processor 180 can determine at least one executable operation of the AI device 100 based on information determined or generated by using a data analysis algorithm or a machine learning algorithm. The processor 180 can also control the components of the AI device 100 to execute the determined operation.

To this end, the processor 180 can request, search, receive, or utilize data of the learning processor 130 or the memory 170. The processor 180 can also control the components of the AI device 100 to execute the predicted operation or the operation determined to be desirable among the at least one executable operation. When the connection of an external device is required to perform the determined operation, the processor 180 can generate a control signal for controlling the external device and may transmit the generated control signal to the external device.

In addition, the processor 180 can acquire intention information for the user input and determine the user's requirements based on the acquired intention information. The processor 180 can also acquire the intention information corresponding to the user input by using at least one of a speech to text (STT) engine for converting speech input into a text string or a natural language processing (NLP) engine for acquiring intention information of a natural language.

At least one of the STT engine or the NLP engine can be configured as an artificial neural network, at least part of which is learned according to the machine learning algorithm. At least one of the STT engine or the NLP engine can be learned by the learning processor 130, be learned by the learning processor 240 of the AI server 200, or be learned by their distributed processing.

In addition, the processor 180 can collect history information including the operation contents of the AI apparatus 100 or the user's feedback on the operation and store the collected history information in the memory 170 or the learning processor 130 or transmit the collected history information to the external device such as the AI server 200. The collected history information can be used to update the learning model.

Further, the processor 180 can control at least part of the components of AI device 100 so as to drive an application program stored in memory 170. Furthermore, the processor 180 may operate two or more of the components included in the AI device 100 in combination so as to drive the application program.

Next, FIG. 2 illustrates an AI server 200 according to an embodiment of the present invention. Referring to FIG. 2, the AI server 200 refers to a device that learns an artificial neural network by using a machine learning algorithm or uses a learned artificial neural network. The AI server 200 may include a plurality of servers to perform distributed processing, or may be defined as a 5G network. Further, the AI server 200 may be included as a partial configuration of the AI device 100, and may perform at least part of the AI processing together.

The AI server 200 may include a communication unit 210, a memory 230, a learning processor 240, a processor 260, and the like. The communication unit 210 can transmit and receive data to and from an external device such as the AI device 100. The memory 230 may include a model storage unit 231. The model storage unit 231 can store a learning or learned model (or an artificial neural network 231a) through the learning processor 240.

Further, the learning processor 240 can learn the artificial neural network 231a by using the learning data. The learning model may be used in a state of being mounted on the AI server 200 of the artificial neural network, or may be used in a state of being mounted on an external device such as the AI device 100.

In addition, the learning model may be implemented in hardware, software, or a combination of hardware and software. If all or part of the learning models are implemented in software, one or more instructions that constitute the learning model may be stored in memory 230. The processor 260 can also infer the result value for new input data by using the learning model and may generate a response or a control command based on the inferred result value.

Figure 3:
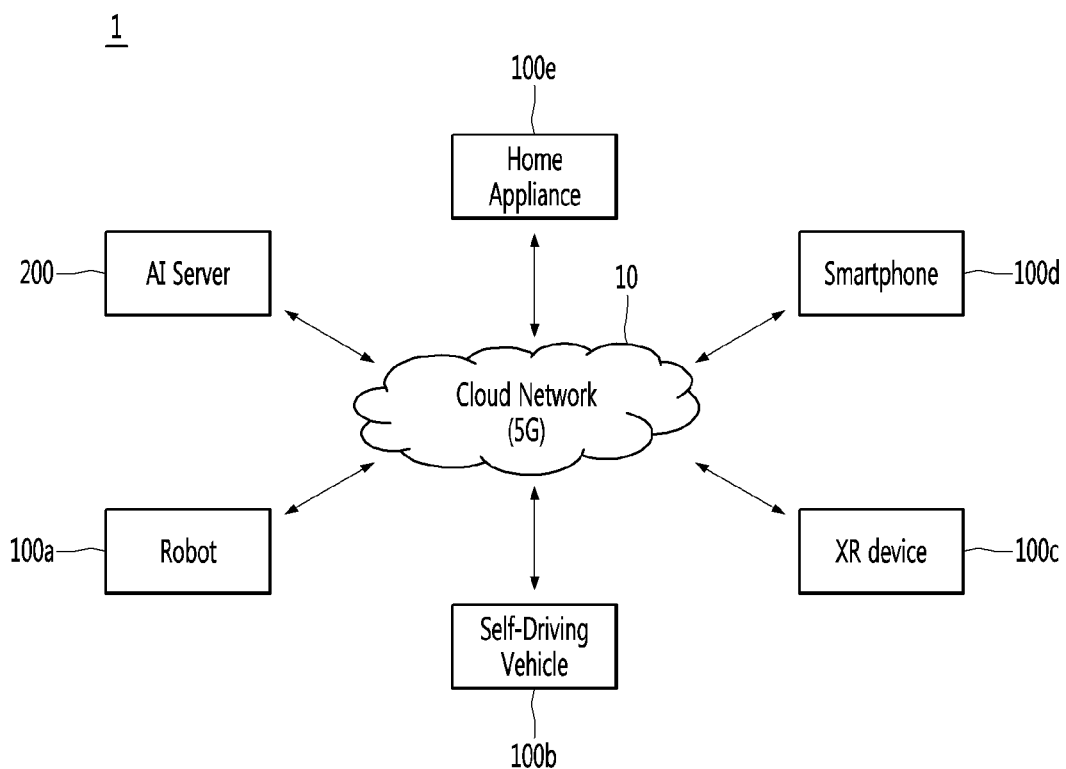
FIG. 3 illustrates an AI system 1 according to an embodiment of the present disclosure.

Next, FIG. 3 illustrates an AI system 1 according to an embodiment of the present invention. Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, can be referred to as AI devices 100a to 100e.

In addition, the cloud network 10 refers to a network that forms part of a cloud computing infrastructure or exists in a cloud computing infrastructure. The cloud network 10 may be configured by using a 3G network, a 4G or LTE network, or a 5G network. That is, the devices 100a to 100e and 200 configuring the AI system 1 can be connected to each other through the cloud network 10. In particular, each of the devices 100a to 100e and 200 may communicate with each other through a base station, but may directly communicate with each other without using a base station.

Further, the AI server 200 may include a server that performs AI processing and a server that performs operations on big data. The AI server 200 can be connected to at least one of the AI devices constituting the AI system 1, that is, the robot 100a, the self-driving vehicle 100b, the XR device 100c, the smartphone 100d, or the home appliance 100e through the cloud network 10, and assist at least part of AI processing of the connected AI devices 100a to 100e.

Further, the AI server 200 can learn the artificial neural network according to the machine learning algorithm instead of the AI devices 100a to 100e, and directly store the learning model or transmit the learning model to the AI devices 100a to 100e. Also, the AI server 200 can receive input data from the AI devices 100a to 100e, infer the result value for the received input data by using the learning model, generate a response or a control command based on the inferred result value, and transmit the response or the control command to the AI devices 100a to 100e.

Alternatively, the AI devices 100a to 100e can infer the result value for the input data by directly using the learning model, and generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like. The robot 100a may include a robot control module for controlling the operation, and the robot control module refers to a software module or a chip implementing the software module by hardware.

Further, the robot 100a can acquire state information about the robot 100a by using sensor information acquired from various kinds of sensors, detect (recognize) surrounding environment and objects, generate map data, determine the route and the travel plan, determine the response to user interaction, or determine the operation. The robot 100a can also use the sensor information acquired from at least one sensor among the lidar, the radar, and the camera so as to determine the travel route and the travel plan.

In addition, the robot 100a can perform the above-described operations by using the learning model composed of at least one artificial neural network. For example, the robot 100a can recognize the surrounding environment and the objects by using the learning model, and determine the operation by using the recognized surrounding information or object information. The learning model may also be learned directly from the robot 100a or be learned from an external device such as the AI server 200.

Further, the robot 100a can perform the operation by generating the result by directly using the learning model, but the sensor information may be transmitted to the external device such as the AI server 200 and the generated result may be received to perform the operation. The robot 100a may also use at least one of the map data, the object information detected from the sensor information, or the object information acquired from the external apparatus to determine the travel route and the travel plan, and control the driving unit such that the robot 100a travels along the determined travel route and travel plan.

Further, the map data may include object identification information about various objects arranged in the space in which the robot 100a moves. For example, the map data may include object identification information about fixed objects such as walls and doors and movable objects such as pollen and desks. Also, the object identification information may include a name, a type, a distance, and a position.

In addition, the robot 100a can perform the operation or travel by controlling the driving unit based on the control/interaction of the user. Further, the robot 100a can acquire the intention information of the interaction due to the user's operation or speech utterance, and determine the response based on the acquired intention information, and may perform the operation.

<AI+Self-Driving>

The self-driving vehicle 100b, to which the AI technology is applied, may be implemented as a mobile robot, a vehicle, an unmanned flying vehicle, or the like. The self-driving vehicle 100b may include a self-driving control module for controlling a self-driving function, and the self-driving control module refers to a software module or a chip implementing the software module by hardware. The self-driving control module may be included in the self-driving vehicle 100b as a component thereof, but may be implemented with separate hardware and connected to the outside of the self-driving vehicle 100b.

In addition, the self-driving vehicle 100b can acquire state information about the self-driving vehicle 100b by using sensor information acquired from various kinds of sensors, detect (recognize) surrounding environment and objects, generate map data, determine the route and the travel plan, or determine the operation. Like the robot 100a, the self-driving vehicle 100b can use the sensor information acquired from at least one sensor among the lidar, the radar, and the camera so as to determine the travel route and the travel plan.

In particular, the self-driving vehicle 100b can recognize the environment or objects for an area covered by a field of view or an area over a certain distance by receiving the sensor information from external devices, or receive directly recognized information from the external devices.

Further, the self-driving vehicle 100b can perform the above-described operations by using the learning model composed of at least one artificial neural network. For example, the self-driving vehicle 100b can recognize the surrounding environment and the objects by using the learning model, and determine the traveling movement line by using the recognized surrounding information or object information. The learning model can also be learned directly from the self-driving vehicle 100a or be learned from an external device such as the AI server 200.

Further, the self-driving vehicle 100b can perform the operation by generating the result by directly using the learning model, but the sensor information may be transmitted to the external device such as the AI server 200 and the generated result may be received to perform the operation. The self-driving vehicle 100b may use at least one of the map data, the object information detected from the sensor information, or the object information acquired from the external apparatus to determine the travel route and the travel plan, and may control the driving unit such that the self-driving vehicle 100b travels along the determined travel route and travel plan.

Also, the map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may also include a name, a type, a distance, and a position.

In addition, the self-driving vehicle 100b can perform the operation or travel by controlling the driving unit based on the control/interaction of the user. Further, the self-driving vehicle 100b can acquire the intention information of the interaction due to the user's operation or speech utterance, and determine the response based on the acquired intention information, and may perform the operation.

<AI+XR>

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c can analyze three-dimensional point cloud data or image data acquired from various sensors or the external devices, generate position data and attribute data for the three-dimensional points, acquire information about the surrounding space or the real object, and render to output the XR object to be output. For example, the XR device 100c can output an XR object including the additional information about the recognized object in correspondence to the recognized object.

The XR device 100c can also perform the above-described operations by using the learning model composed of at least one artificial neural network. For example, the XR device 100c can recognize the real object from the three-dimensional point cloud data or the image data by using the learning model, and provide information corresponding to the recognized real object. The learning model can also be directly learned from the XR device 100c, or be learned from the external device such as the AI server 200. Further, the XR device 100c can perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like. The robot 100a, to which the AI technology and the self-driving technology are applied, refers to the robot itself having the self-driving function or the robot 100a interacting with the self-driving vehicle 100b.

The robot 100a having the self-driving function can collectively refer to a device that moves for itself along the given movement line without the user's control or moves for itself by determining the movement line by itself. The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

In addition, the robot 100a that interacts with the self-driving vehicle 100b exists separately from the self-driving vehicle 100b and can perform operations interworking with the self-driving function of the self-driving vehicle 100b or interworking with the user who rides on the self-driving vehicle 100b. Further, the robot 100a interacting with the self-driving vehicle 100b can control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b can monitor the user boarding the self-driving vehicle 100b, or control the function of the self-driving vehicle 100b through the interaction with the user. For example, when it is determined that the driver is in a drowsy state, the robot 100a can activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b can provide information or assist the function to the self-driving vehicle 100b outside the self-driving vehicle 100b. For example, the robot 100a can provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like. The robot 100a, to which the XR technology is applied, refers to a robot that is subjected to control/interaction in an XR image. In this case, the robot 100a may be separated from the XR device 100c and interwork with each other.

When the robot 100a, which is subjected to control/interaction in the XR image, can acquire the sensor information from the sensors including the camera, the robot 100a or the XR device 100c can generate the XR image based on the sensor information, and the XR device 100c can output the generated XR image. Also, the robot 100a can operate based on the control signal input through the XR device 100c or the user's interaction. For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like. The self-driving driving vehicle 100b, to which the XR technology is applied, refers to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image can acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

Further, when the XR object is output to the HUD, at least part of the XR object can be output so as to overlap the actual object to which the passenger's gaze is directed. Meanwhile, when the XR object is output to the display provided in the self-driving vehicle 100b, at least part of the XR object can be output so as to overlap the object in the screen. For example, the self-driving vehicle 100b can output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, acquires the sensor information from the sensors including the camera, the self-driving vehicle 100b or the XR device 100c can generate the XR image based on the sensor information, and the XR device 100c can output the generated XR image. The self-driving vehicle 100b can also operate based on the control signal input through the external device such as the XR device 100c or the user's interaction.

Meanwhile, the display device described below may include a portion or all of the configuration of the AI device 100 described with reference to FIG. 1 and may perform a function performed by the AI device 100. Therefore, the term "display device 100" may be used interchangeably with the term "AI device 100".

In addition, the term "display device 100" may be used interchangeably with the term "artificial intelligence display device 100".

Figure 4:
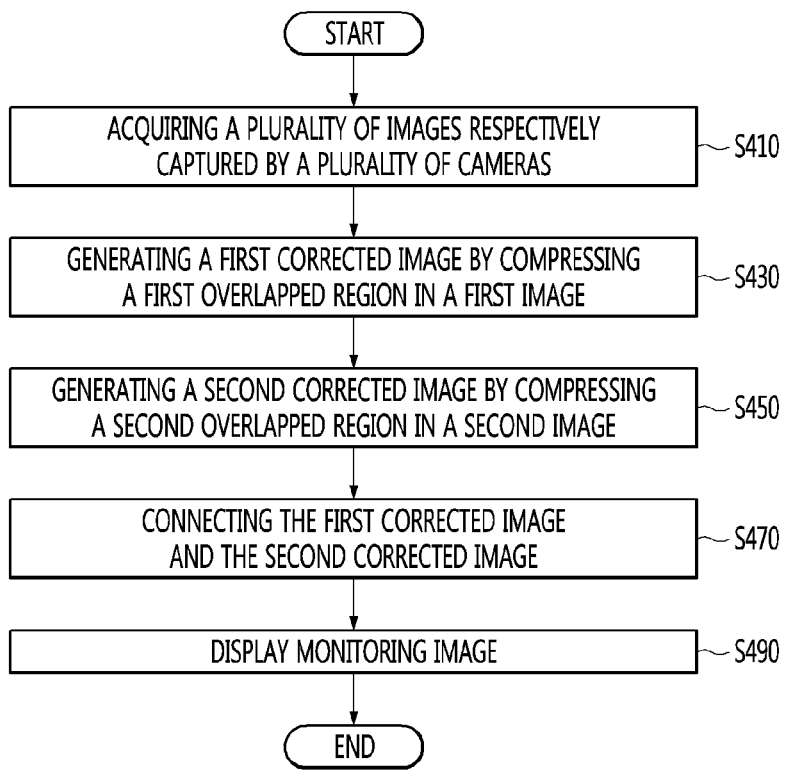
FIG. 4 is a block diagram for describing a method for operating a display device according to an embodiment of the present disclosure.

FIG. 4 is a block diagram for describing a method for operating a display device according to an embodiment of the present disclosure.

According to FIG. 4, a method for operating the display device may include obtaining s plurality of images captured by a plurality of cameras, respectively (S410), generating a first corrected image obtained by compressing a first overlapped region in a first image of the plurality of images (S430), generating a second corrected image obtained by compressing a second overlapped region in a second image of the plurality of images (S450), connecting the first corrected image and the second corrected image (S470), and displaying a monitoring image generated by using the plurality of images (S490).

Figure 5:
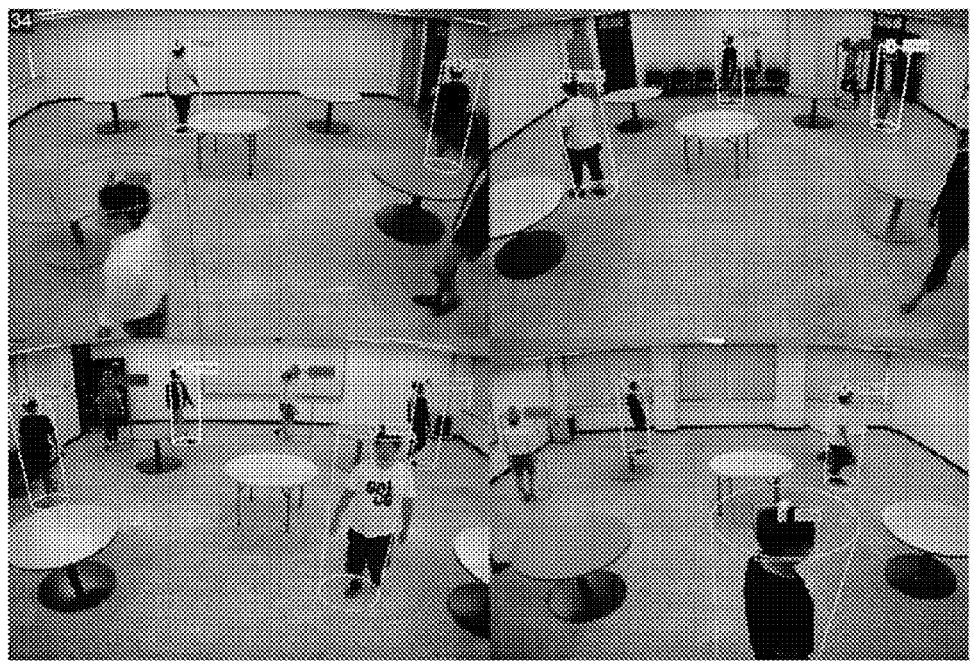
FIG. 5 is a view for explaining a problem according to the existing CCTV installation method.

FIG. 5 is a view for explaining a problem according to the existing CCTV installation method.

In the related art, a plurality of cameras having narrow angles of view were installed to capture an indoor space. In addition, in the related art, the camera was installed slopingly on the ceiling or installed on the wall.

Accordingly, a side view image was captured as illustrated in FIG. 5, and in this case, it was difficult to accurately determine the two-dimensional position of the object in the indoor space. In addition, a blind spot that could not be captured by the camera could occur, and there was a problem that the camera had to be repositioned whenever the disposition of the furniture, display stands, or the like in the indoor space was changed.

FIG. 6 is a view for explaining a camera disposition according to the present disclosure.

Referring to FIG. 6a, a plurality of cameras 610 may be installed on the ceiling of an indoor space.

In this case, the plurality of cameras 610 may be arranged at regular intervals on the ceiling of the indoor space.

In more detail, the plurality of cameras 610 may be disposed in a line at regular intervals on the ceiling of the indoor space. For example, the plurality of cameras 610 may be disposed in a line while maintaining an interval of 3 meters.

In another embodiment, the plurality of cameras 610 may be installed in a mesh form at regular intervals on the ceiling of the indoor space. In this case, the distances between the first camera of the plurality of cameras and cameras adjacent (closest) to the first camera may all be the same. In addition, the distances between the second camera adjacent to (closest to) the first camera and cameras adjacent to the second camera may all be the same.

Meanwhile, the plurality of cameras 610 may be installed on the ceiling to capture in the vertical direction.

Herein, the camera capturing in the vertical direction may mean that the front of the camera (for example, a direction extending vertically from the center point of the camera lens) is perpendicular to the floor.

As described above, when one monitoring image is generated by arranging a plurality of cameras at regular intervals on the ceiling of an indoor space to capture in a vertical direction and stitching a plurality of images respectively captured by the plurality of cameras, the generated monitoring image may be an image implementing the indoor space as a plan view as illustrated in FIG. 6b.

Meanwhile, each of the plurality of cameras may include a fisheye lens having an angle of view of 180 degrees. In this case, each of the images captured by the plurality of cameras may be an image captured in all directions within an angle of view of 180 degrees.

In addition, since each of the plurality of cameras is installed on the ceiling and captures in the vertical direction, each of the images captured by the plurality of cameras may be an image of a virtual hemisphere in contact with the ceiling about the camera installed on the ceiling.

Accordingly, each of the plurality of cameras may capture in all directions except the ceiling, and the monitoring image stitching the images captured by the plurality of cameras may be an image capturing all indoor spaces except the ceiling.

Meanwhile, the plurality of cameras may be one component of the display device and may be separate devices from the display device. Meanwhile, when the plurality of cameras are configured as a separate device from the display device, the processor of the display device may communicate with the plurality of cameras through a communication unit, and receive a plurality of images respectively captured by the plurality of cameras from the plurality of cameras.

FIG. 7 is a view for describing a first full image captured by a first camera of a plurality of cameras and a first image obtained by cutting a partial region of the first full image.

The first camera is merely an example of any one of a plurality of cameras, and the process of processing the first camera or an image captured by the first camera may be applied to another camera or an image captured by another camera as it is.

An angle of view of the first camera may overlap an angle of view of the second camera adjacent to the first camera. Here, the fact that the angle of view of the first camera overlaps the angle of view of the second camera adjacent to the first camera may mean that the first full image captured by the first camera and the second full image captured by the second camera have a region overlapping each other.

Therefore, the processor of the display device may generate a first image 720 obtained by cutting a partial region of the first full image 710 captured by the first camera.

For example, the first full image 710 may be an image captured by a fisheye lens having an angle of view of 180 degrees. In this case, the processor of the display device may generate the first image 720 by cutting out the remaining region while leaving the region 711 necessary for generating the monitoring image of the first full images 710 captured by the first camera. Here, the first image 720 may be an image included in the monitoring image.

This process may be applied to images captured by other cameras placed on the ceiling.

In detail, the processor of the display device may generate a second image by cutting out a partial region of the second full image captured by the second camera.

For example, the second full image may be an image captured by a fisheye lens having an angle of view of 180 degrees. In this case, the processor of the display device may generate the second image by cutting out the remaining region while leaving the region necessary for generating the monitoring image of the second full images captured by the second camera. Here, the second image may be an image included in the monitoring image.

Meanwhile, the processor of the display device may warp in the process of obtaining the first image 720 from the first full image 710. Here, the warp may be to move the space to another space.

In detail, the image captured by a fisheye lens having an angle of view of 180 degrees is an image obtained by capturing a hemisphere, and the first image 720 used for the monitoring image is a planar image. Therefore, the processor of the display device may extract the region 711 necessary for generating the monitoring image and warp the region 711 necessary for generating the curved monitoring image to the first image 720 having a planar shape.

More specifically, the processor of the display device may extract the region 711 necessary for generating the monitoring image in the form of a rhombus having sides of the curve. The processor of the display device covers the virtual mesh on the region 711 necessary for generating the monitoring image, and in this case, the virtual mesh may also be drawn in a curve. In this case, the curved regions 711 may be converted into the planar first image 720 by mapping respective intersection points existing in the mesh on a plane and interpolating the region between the intersection points.

In this case, the first image 720 may have a quadrangular shape having sides of straight lines, and the mesh covered in the first image 720 may be drawn in a straight line. In addition, all the intervals (left and right intervals, up and down intervals) of intersection points of the mesh covered in the first image 720 may be the same.

Meanwhile, the warp described above may be applied to images captured by other cameras disposed on the ceiling.

Meanwhile, the processor of the display device may acquire a plurality of full images respectively captured by the plurality of cameras. The processor of the display device may cut a partial region of each of the plurality of full images to obtain a plurality of images. Here, the plurality of images may be images included in the monitoring image.

As described above, according to the present disclosure, a plan view of an indoor space may be implemented as an image by arranging a plurality of cameras at predetermined intervals on the ceiling and capturing in the vertical direction of the cameras. Accordingly, accurate two-dimensional positioning of the fixed object and the moving object in the indoor space is possible.

In addition, since the angles of view of the adjacent cameras overlap, the blind spots that are not captured by the camera can be eliminated, and even if the disposition of furniture or the display stands in the indoor space is changed, there is no need to reposition the camera.

Meanwhile, the region 711 necessary for generating the monitoring image may vary according to the distance between the plurality of cameras.

For example, FIG. 7 is an image captured by the first camera in a case where a plurality of cameras are disposed in a mesh form when the distance between the cameras is 2 m*2 m.

In addition, FIG. 8 is an image captured by the first camera when the cameras have an interval of 3 m*3 m, and FIG. 9 is an image captured by the first camera when the cameras have an interval of 4 m*4 m.

Referring to FIGS. 7 to 9, it can be seen that as the interval between cameras increases, a region 711 necessary for generating a monitoring image increases in the image.

As the region 711 necessary for generating the monitoring image in the image increases, large distortion may occur in the process of converting the curved region 711 into the planar image. However, as the distance between cameras increases, the number of cameras necessary for installing decreases, which may be advantageous in terms of economics.

FIGS. 10 to 11 are views for describing a reference height as a reference for extracting a first image and a second image.

First, the problem when the reference height is set to the floor will be described with reference to FIG. 10.

An example of the first camera 1010 and the second camera 1020 of the plurality of cameras will be described.

In FIG. 10a, a first camera 1010 and a second camera 1020 adjacent to the first camera 1010 are illustrated.

In addition, in FIG. 10b, the first image 1011 obtained by cutting out a partial region of the first full image captured by the first camera 1010 and the second image 1021 obtained by cutting out a partial region of the second full image captured by the second camera 1020 is illustrated.

An angle of view θ1-1 corresponding to the first image 1011 and an angle of view θ2-1 corresponding to the second image 1021 are illustrated. The angles of view θ1-1 and θ2-1 described herein do not mean the maximum angles of view that can be captured by the cameras but may mean angles of view corresponding to the remaining images when a partial region of the full image captured by the camera is cut out.

In more detail, the processor of the display device may generate the first image 1011 obtained by cutting a partial region of the first full image captured by the first camera, while leaving the region 711 necessary for generating the monitoring image.

In this case, the angle of view θ1-1 corresponding to the first image 1011 may mean a minimum angle of view of a camera necessary for capturing the first image 1011. For example, when the full image captured by the camera having the angle of view of 75 degrees is the first image 1011, the angle of view corresponding to the first image 1011 may be 75 degrees.

In other words, when the first camera 1010 includes a fisheye lens having an angle of view of 180 degrees, the first full image captured by the first camera 1010 may be an image within a range of an angle of view of 180 degrees. When the angle of view corresponding to the first image 1011 is 75 degrees, the processor may cut out a range of the angle of view of 0 degrees to 52.5 degrees and a range of the angle of view of 127.5 degrees to 180 degrees of the first full image and generate a first image 1011 in a range of the angle of view of 52.5 degrees to 127.5 degrees.

Similarly, when the angle of view θ2-1 corresponding to the second image 1021 is 75 degrees, the processor may cut out the region of the range of the angle of view of 0 degrees to 52.5 degrees and the region of the range of the angle of view of 127.5 degrees to 180 degrees of the second full image captured by the second camera 1020 and generate a second image 1021 in a range of the angle of view of 52.5 degrees to 127.5 degrees.

Meanwhile, the processor may generate a monitoring image by connecting a plurality of images that have undergone the same process as above and, in this process, may connect the first image 1011 to the second image 1021 adjacent to the first image 1011.

Meanwhile, as illustrated in FIG. 10*a*, it is assumed that an angle of view θ1-1 corresponding to the first image 1011 and an angle of view θ2-1 corresponding to the second image 1021 meet on the floor 1050.

In this case, one leg of the user is positioned in the angle of view θ1-1 corresponding to the first image 1011, and the opposite leg of the user is positioned in the angle of view θ2-1 corresponding to the second image 1021.

Therefore, two legs of the user appear in the third image 1030 generated by connecting the first image 1011 and the second image 1021.

However, the torso portion and the head portion of the user are not positioned in the angle of view θ1-1 corresponding to the first image 1011 and not in the angle of view θ2-1 corresponding to the second image 1021.

Therefore, the torso portion and the head portion of the user do not appear in the third image 1030 generated by connecting the first image 1011 and the second image 1021.

Therefore, when a partial region of the full image captured by the first camera is cut out and a partial region of the full image captured by the second camera is cut out, the blind spots are generated when some regions are cut out to meet the angle of view based on the floor surface. Therefore, in a case where the monitoring image is implemented as a video when a person passes the stitching region between the first image 1011 and the second image 1021, all the person will seem to disappear for a while or most of the person will seem to disappear for a while.

Such a phenomenon may cause an unnatural image to be provided to the person who is monitoring and may cause performance degradation of object tracking when object tracking is performed using the monitoring image.

Next, with reference to FIG. 11, the problem at the time of setting a reference height as a head height (or parietal height) is described.

An example of the first camera 1010 and the second camera 1020 of the plurality of cameras will be described.

In FIG. 11*b*, the first image 1012 obtained by cutting a partial region of the first full image captured by the first camera 1010 and the second image 1022 obtained by cutting a partial region of the second full image captured by the second camera 1020 are illustrated.

An angle of view θ1-2 corresponding to the first image 1012 and an angle of view θ2-2 corresponding to the second image 1022 are illustrated. The angles of view θ1-2 and θ2-2 described herein do not mean the maximum angles of view that can be captured by the camera and when the partial region of the full images captured by the camera is cut out, the angles of view θ1-2 and θ2-2 may mean the angles of view corresponding to the remaining images.

For example, when the first camera 1010 includes a fisheye lens having an angle of view of 180 degrees, the first full image captured by the first camera 1010 may be an image within a range of 180 degrees of view. When the angle of view θ1-2 corresponding to the first image 1012 is 135 degrees, the processor may cut out the region of the range of the angle of view of 0 degrees to 22.5 degrees and the region of the range of the angle of view of 157.5 degrees to 180 degrees of the first full image and generate a first image 1012 having a range of an angle of view of 22.5 degrees to 157.5 degrees.

Similarly, when the angle of view θ2-2 corresponding to the second image 1022 is 135 degrees, the processor may cut out the region of the range of the angle of view of 0 degrees to 22.5 degrees and the region of the range of the angle of view of 157.5 degrees to 180 degrees of the second full image and generate a second image 1022 having a range of an angle of view of 22.5 degrees to 157.5 degrees.

Meanwhile, the processor may generate a monitoring image by connecting a plurality of images that have undergone the same process as above, and in this process, the first image 1012 may be connected to the second image 1022 adjacent to the first image 1012.

Meanwhile, as illustrated in FIG. 11*a*, it is assumed that the angle of view θ1-2 corresponding to the first image 1012 and the angle of view θ2-2 corresponding to the second image 1022 are met at a human parietal height h2.

In this case, a portion of the angle of view θ1-2 corresponding to the first image 1012 and a portion of the angle of view θ2-2 corresponding to the second image 1022 may overlap. Accordingly, regions overlapping each other may exist in the first image 1012 and the second image 1022.

In other words, the first overlapping region may exist in the first image 1012, and the overlapping region may exist in the second image 1022. In addition, the first overlapping region existing in the first image 1012 may be an image in which the same region is captured by the first camera 1010, and the second overlapping region existing in the second image 1022 may be an image in which the same region is captured by the second camera 1020.

Meanwhile, FIG. 11*b* illustrates a third image 1040 generated by connecting the first image 1012 and the second image 1022.

Referring to FIG. 11*b*, since the angle of view θ1-2 corresponding to the first image 1012 and the angle of view θ2-2 corresponding to the second image 1022 meet at the parietal height h2 of the person, the parietal portion or the head portion of the person appears in natural form.

However, since the lower portion of the head was repeatedly captured at different angles, the front of the torso and the leg of the person appears in the first image 1012, and the back of the torso and the leg of the person appears in the second image 1022.

Accordingly, the third image 1030 generated by connecting the first image 1011 and the second image 1021 may appear as if two people exist.

In addition, such a phenomenon may cause an unnatural image to be provided to the monitoring person, and when object tracking is performed using the image who is monitoring, it may cause performance degradation of the object tracking (it can be perceived as having two people).

Therefore, there is a need for a solution to the above-described problems.

Figure 12:
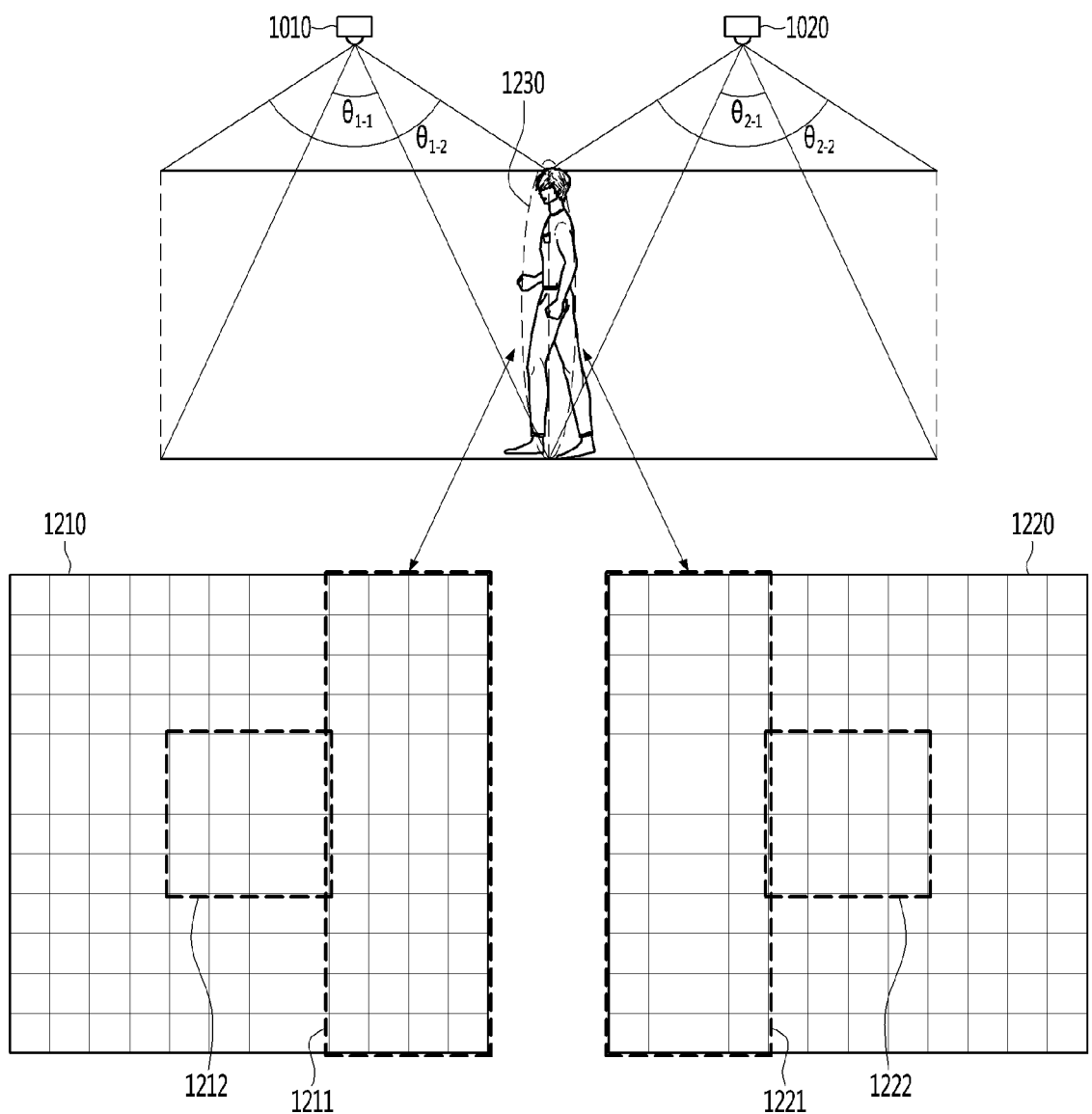
FIGS. 12 to 13 are views for describing a method for generating a corrected image obtained by compressing an overlapping region.
Figure 13:
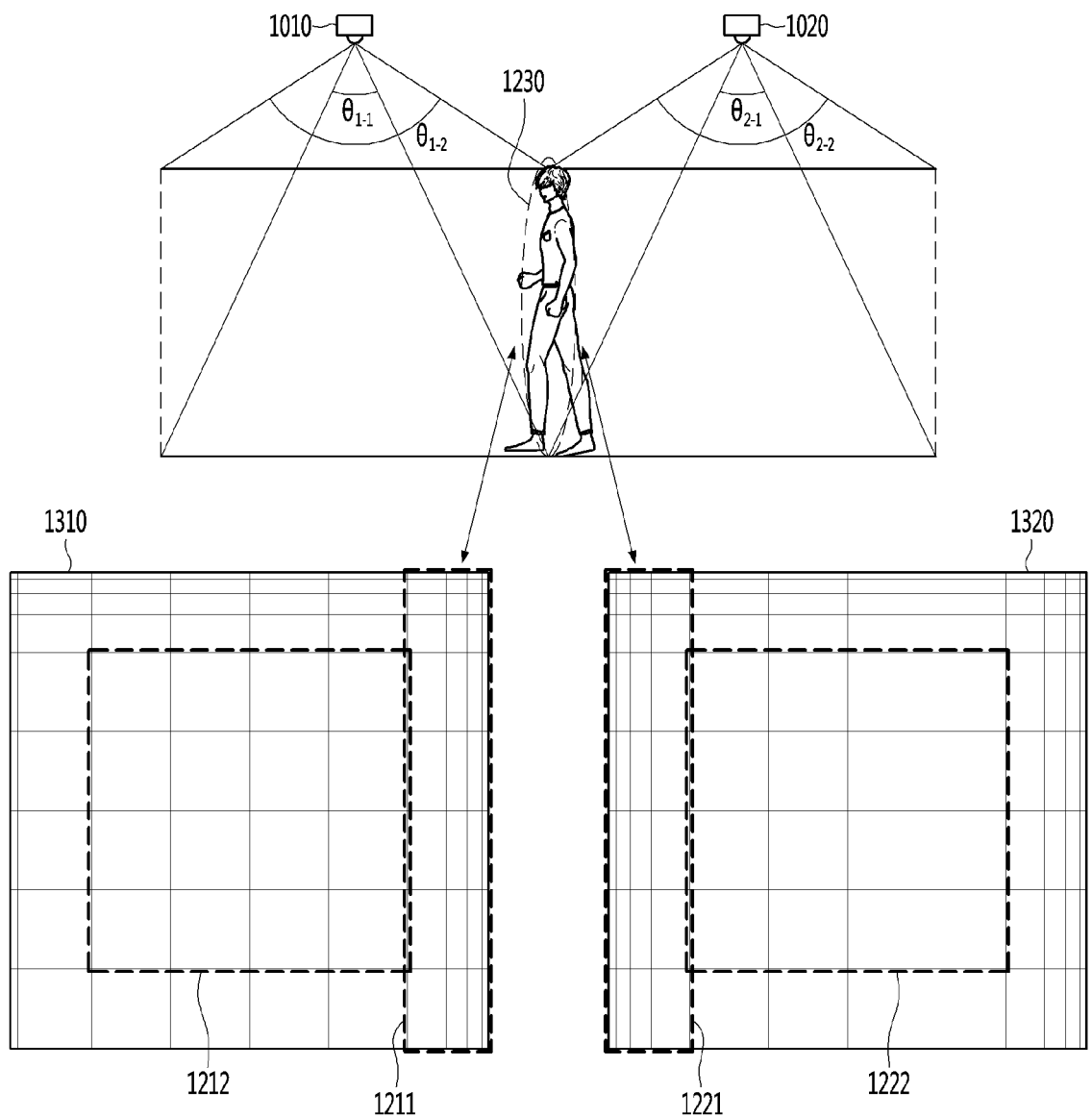

FIGS. 12 to 13 are views for describing a method for generating a corrected image obtained by compressing an overlapping region.

The plurality of images may include a first image 1210 and a second image 1220 adjacent to the first image 1210.

Meanwhile, the processor is configured to generate the first image 1210 and the second image 1220 such that the angle of view θ1-2 corresponding to the first image 1210 and the angle of view θ2-2 corresponding to the second image 1020 meet at a reference height higher than the floor.

Here, the reference height higher than the floor here may be ideally the head height of the person, in particular, the parietal height of the person. However, since people of various heights can move around in the indoor space, the reference height higher than the floor may be set to the average height of the corresponding country or the average height of a person mainly entering the indoor space.

For example, in an indoor space of a kindergarten where seven-year-olds attend, the reference height higher than the floor may be the average height of seven-year-olds.

Meanwhile, when the angle of view θ1-2 corresponding to the first image is set based on the height of the head, compared to the case of setting the angle of view θ1-1 corresponding to the first image based on the height of the floor, there may be a region 1230 added to the first image.

In addition, when the angle of view θ2-2 corresponding to the second image is set based on the height of the head, compared to the case of setting the angle of view θ2-1 corresponding to the second image based on the height of the floor, there may be a region 1230 added to the second image.

The region 1230 added in this way exists in both the first image 1210 and the second image 1220. The additional region 1230 may appear as a first overlapped region 1211 on the first image 1210 and as a second overlapped region 1221 on the second image 1220.

In other words, the first overlapping region 1211 is a region that exists as the first image 1210 and the second image 1220 are joined based on a point higher than the floor and may be a region on the first image 1210 overlapping a portion of the second image 1220.

In addition, the second overlapping region 1221 is a region that exists as the first image 1210 and the second image 1220 are joined based on a point higher than the floor and may be a region on the second image 1220 overlapping a portion of the first image 1210.

Meanwhile, the first image 1210 may include a non-overlapping region 1212 that does not overlap other images adjacent to the first image.

In addition, the second image 1220 may also have a non-overlapping region 1222 that does not overlap other images adjacent to the second image.

Meanwhile, when the first image 1210 and the second image 1220 are connected in a state of FIG. 12, the problem described with reference to FIG. 10 occurs as it is.

Therefore, the processor may distort the first overlapping region 1211.

In detail, referring to FIG. 13, the processor may generate a first corrected image 1310 obtained by compressing the first overlapping region 1211 overlapping the second image 1220 in the first image 1210.

Here, the fact that the overlapped region 1211 is compressed may mean that a portion or all of the overlapped region 1211 is compressed.

In addition, "compression" may mean that the width of the overlapping region 1211 is reduced in the direction in which the adjacent images are connected. For example, when the second image 1220 is connected to the right side of the first image 1210, the processor may reduce the left and right widths of the overlapping region 1211.

Meanwhile, the compressed overlapping region 1211 may be an image which includes the image information included in the overlapping region 1211 before compression but is reduced in width, without losing the image information included in the overlapping region 1211 before compression.

Meanwhile, the overlapped region 1211 may be compressed while the non-overlapping region 1212 may be expanded.

Meanwhile, the compression rate of the first overlapping region 1211 may increase toward the edge of the first image 1210.

In this case, the compression ratio may mean a degree of compression. For example, when the second image 1220 is connected to the right side of the first image 1210, the processor may reduce the left and right widths of the overlapping region 1211. The left and right widths of the region closer to the edge of the overlapping region 1211 (the region closer to the boundary with the second image) may be less than the left and right widths of the region less closer to the edge of the overlapping region 1211 (the region less closer to the boundary with the second image).

Meanwhile, in FIG. 7, it is described that the processor extracts a region 711 necessary for generating a monitoring image and warps the region 711 necessary for generating a curved monitoring image to the first image 720 in a planar shape. In this case, the processor may generate a first corrected image obtained by compressing a first overlapped region overlapping the second image in the first image 720.

However, the present disclosure is not limited thereto, and the processor may directly warp the region 711 necessary for generating the monitoring image to the first corrected image 1310.

In detail, the processor of the display device may extract the region 711 necessary for generating the monitoring image in the form of a rhombus having curved sides. The processor of the display device covers the virtual mesh on the region 711 necessary for generating the monitoring image, and in this case, the virtual mesh may also be drawn in a curve. In this case, by mapping each intersection present in the mesh on a plane and interpolating the regions between the intersections, the curved region 711 may be converted into the first corrected image 1310 obtained by compresses the first overlapping region 1211 and expand the non-overlapping region 1212. In this case, the first corrected image 1310 may have a quadrangular shape having sides of straight lines, and the mesh covered in the first corrected image 1310 may be drawn in a straight line.

However, the intervals (left and right intervals, up and down intervals) of intersection points of the mesh covered by the first corrected image 1310 may be smaller in the first overlapped region 1211 than in the non-overlapped region 1212. In addition, the intervals (left and right intervals, up and down intervals) of intersection points of the mesh covered in the first corrected image 1310 may decrease from the first overlapping region 1211 toward the edge of the first corrected image 1310.

Meanwhile, the same process may be performed on the second image 1220 and other images.

In detail, referring to FIG. 13, the processor may generate a second corrected image 1320 obtained by compressing a second overlapping region 1221 overlapping the first image 1210 in the second image 1220.

Here, the fact that the second overlapped region 1221 is compressed may mean that a portion or all of the second overlapped region 1221 is compressed.

In addition, "compression" may mean that the width of the overlapping region 1221 is reduced in the direction in which the adjacent images are connected. For example, when the first image 1210 is connected to the left side of the second image 1220, the processor may reduce the left and right widths of the second overlapping region 1221.

Meanwhile, the second overlapping region 1221 may be compressed while the non-overlapping region 1222 may be expanded.

Meanwhile, the compression rate of the second overlapping region 1221 may increase toward the edge of the second image 1220.

In addition, the processor may extract a region necessary for generating a monitoring image from the full image captured by the second camera and warp the extracted region into a second corrected image.

FIG. 14 is a view illustrating a first image and a first corrected image obtained by compressing a first overlapped region in a first image.

The angle of view corresponding to the first image 1410 and the angle of view corresponding to the first corrected image 1420 are the same. In other words, the same region is included in the first image 1410 and the first corrected image 1420, so the image information included in the first image 1410 is the same as the image information included in the first corrected image 1420.

However, as the overlapping region is compressed, the size of the overlapping region of the first corrected image 1420 may be smaller than the size of the overlapping region of the first image 1410. In addition, as the non-overlapping region is expanded, the size of the non-overlapping region of the first corrected image 1420 may be larger than that of the non-overlapping region of the first image 1410.

Meanwhile, it has been described that the plurality of cameras are disposed on the ceiling in the form of a mesh. Therefore, the first image 1410 may be connected not only to the second image on the right but also to other images. For example, the first image 1410 may be connected to a third image on the upper side, a fourth image on the left side, and a fifth image on the lower side.

In this case, the first image may include a plurality of overlapping regions, and the processor may generate a first corrected image compressing the plurality of overlapping regions.

In other words, the first corrected image may include 1 to 4 overlapped regions, and the processor may generate a first corrected image obtained by compressing 1 to 4 overlapped regions.

Meanwhile, the processor may generate a monitoring image by using a plurality of images respectively captured by the plurality of cameras.

In detail, the processor may generate a plurality of images obtained by cutting out a partial region from the plurality of full images respectively captured by the plurality of cameras. The processor may generate a plurality of corrected images corresponding to each of the plurality of images and generate a monitoring image obtained by connecting each of the plurality of corrected images with one or more adjacent corrected images.

Meanwhile, in the foregoing description, it is described that the monitoring image is generated from the remaining image after cutting out a partial region from the full image captured by the camera.

However, a monitoring image may be generated by connecting a plurality of full images respectively captured by a plurality of cameras without cutting a partial region.

In more detail, the processor may use the first full image captured by the first camera as the first image described above. The processor may generate a first corrected image obtained by compressing a first overlapped region overlapping the second image in the first image.

In addition, the processor may use the second full image captured by the second camera as the second image described above. The processor may generate a second corrected image obtained by compressing a second overlapped region overlapping the first image in the second image.

Meanwhile, in order to directly connect the first full image and the second full image, the interval between the first camera and the second camera has to be adjusted.

In detail, the interval between the first camera and the second camera may be determined such that an angle of view corresponding to the first camera and an angle of view corresponding to the second camera meet at a reference height higher than a floor.

For example, referring back to FIG. 11, it is assumed that the range of the maximum angle of view of the first camera 1010 is 135 degrees and the range of the maximum angle of view of the second camera 1020 is 135 degrees. The first camera 1010 and the second camera 1020 capture in a vertical direction.

In this case, an interval dl between the first camera 1010 and the second camera 1020 may be set such that an angle of view of the first camera 1010 and an angle of view of the second camera 1020 meet at a head height of the person.

Meanwhile, the processor may generate a monitoring image by stitching a plurality of corrected images corresponding to the plurality of cameras, respectively.

Figure 15:
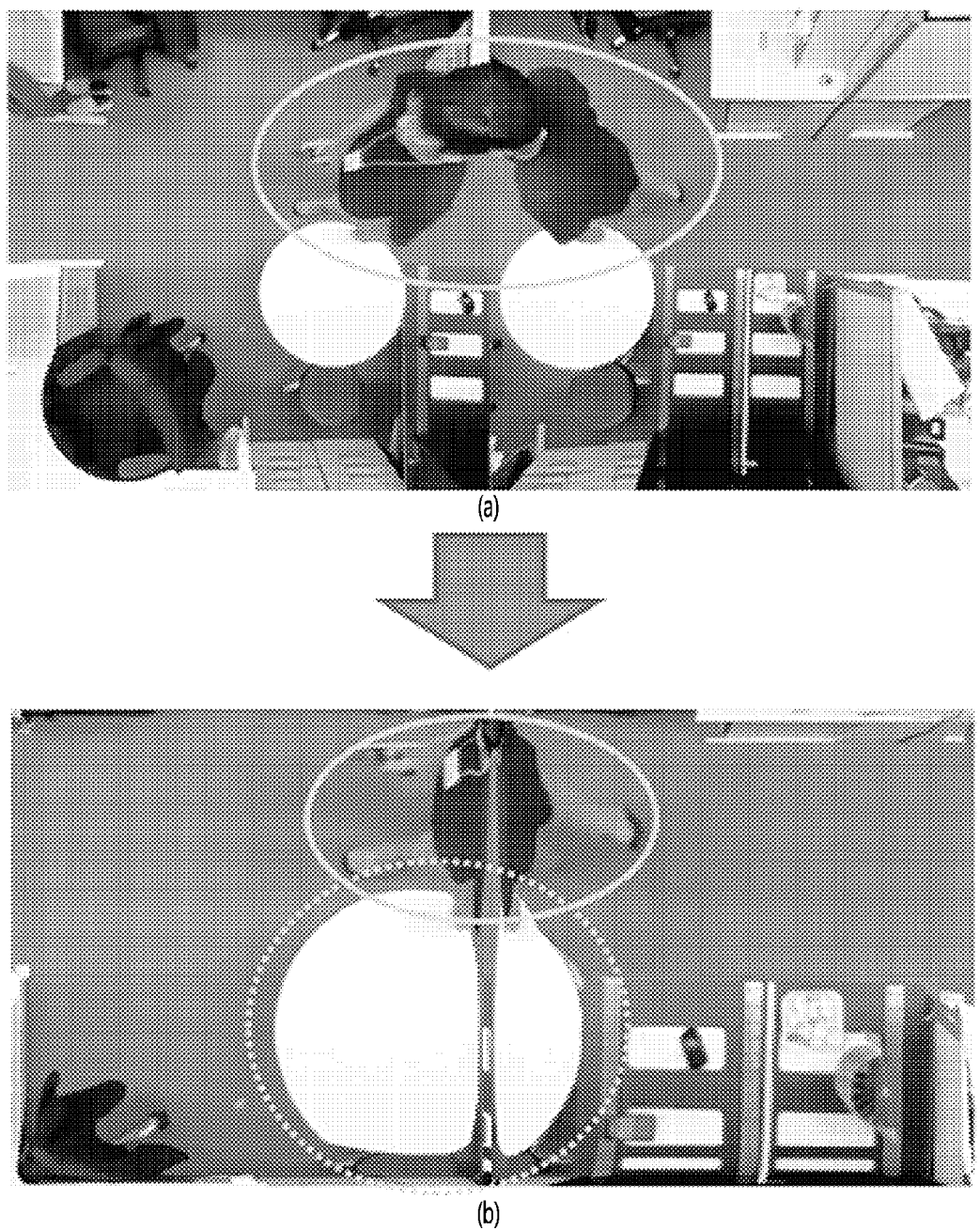
FIG. 15 is a view illustrating a monitoring image connecting two images.

FIG. 15 is a view illustrating a monitoring image connecting two images.

FIG. 15a illustrates a monitoring image connecting the first image and the second image that do not compress the overlapping region, and FIG. 15b illustrates a monitoring image connecting the first corrected image and the second corrected image which compress the overlapping region.

Referring to FIG. 15a, when the object (person) is located at the boundary between the first image and the second image, it can be seen that the object (person) appears in a separated form in the monitoring image. Here, the fact that the object (person) is represented in a separate form may mean that all or a portion of an object (for example, a torso) appears to exist in plurality.

However, referring to FIG. 15b, when the object (person) is located at the boundary of the first corrected image and the second corrected image, it can be seen that the object (person) appears in a form that is not separated in the monitoring image. Here, the fact that an object (a person) may appear in an unseparated form may mean that a portion or all of an object (for example, a torso) appears to exist. In addition, the fact that an object (person) appears in an unseparated form may mean that the object appears to be traceable by an object tracking technique, rather than completely reflecting the shape of the real object.

In addition, it can be seen that the table also appears in one shape in FIG. 15b, whereas the table is illustrated in two in FIG. 15a.

Meanwhile, FIG. 15 illustrates a monitoring image generated when the cameras have an interval of 2 m*2 m when a plurality of cameras are disposed in a mesh form.

Figure 16:
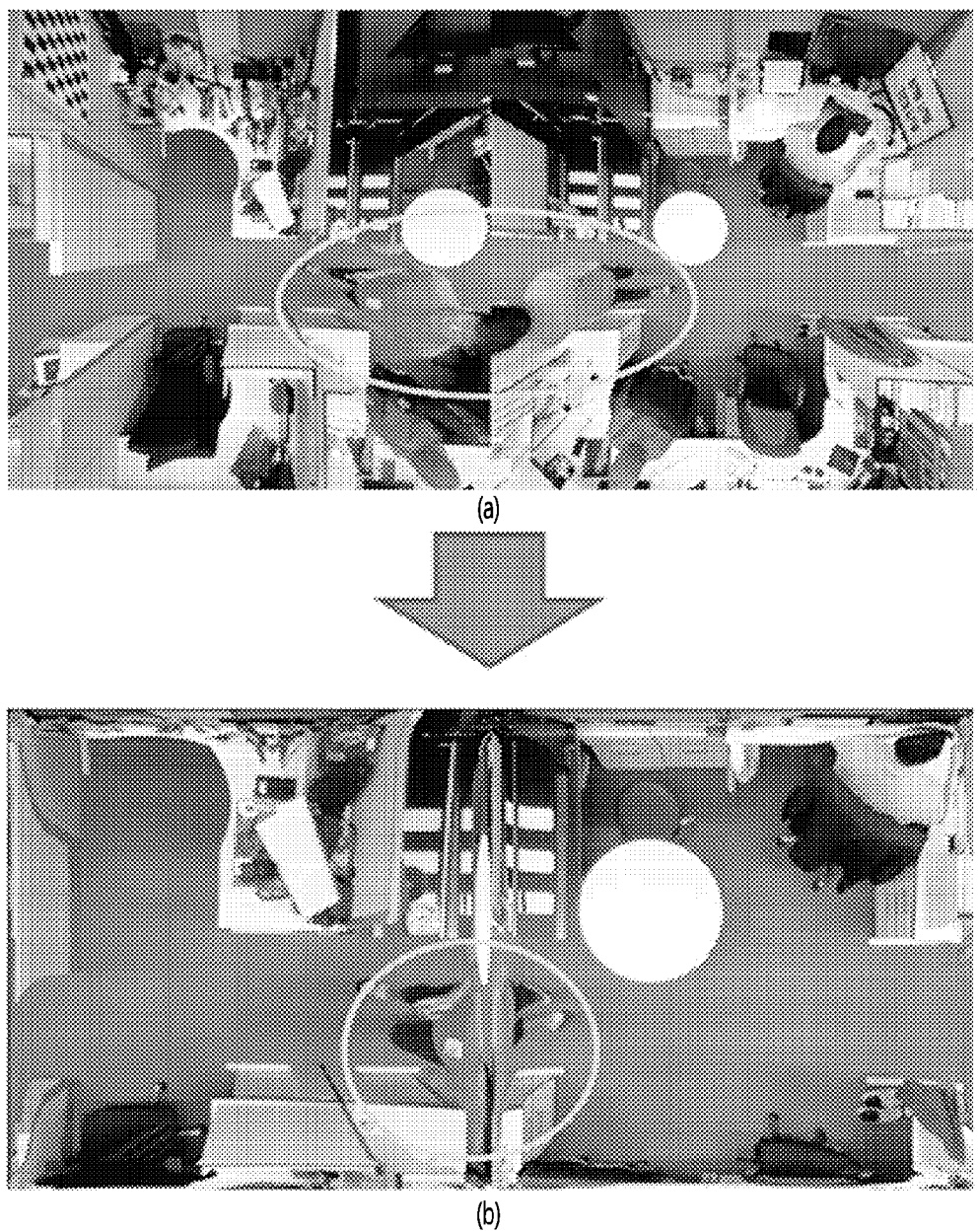
FIG. 16 is a monitoring image generated when the cameras have an interval of 3 m*3 m.
Figure 17:
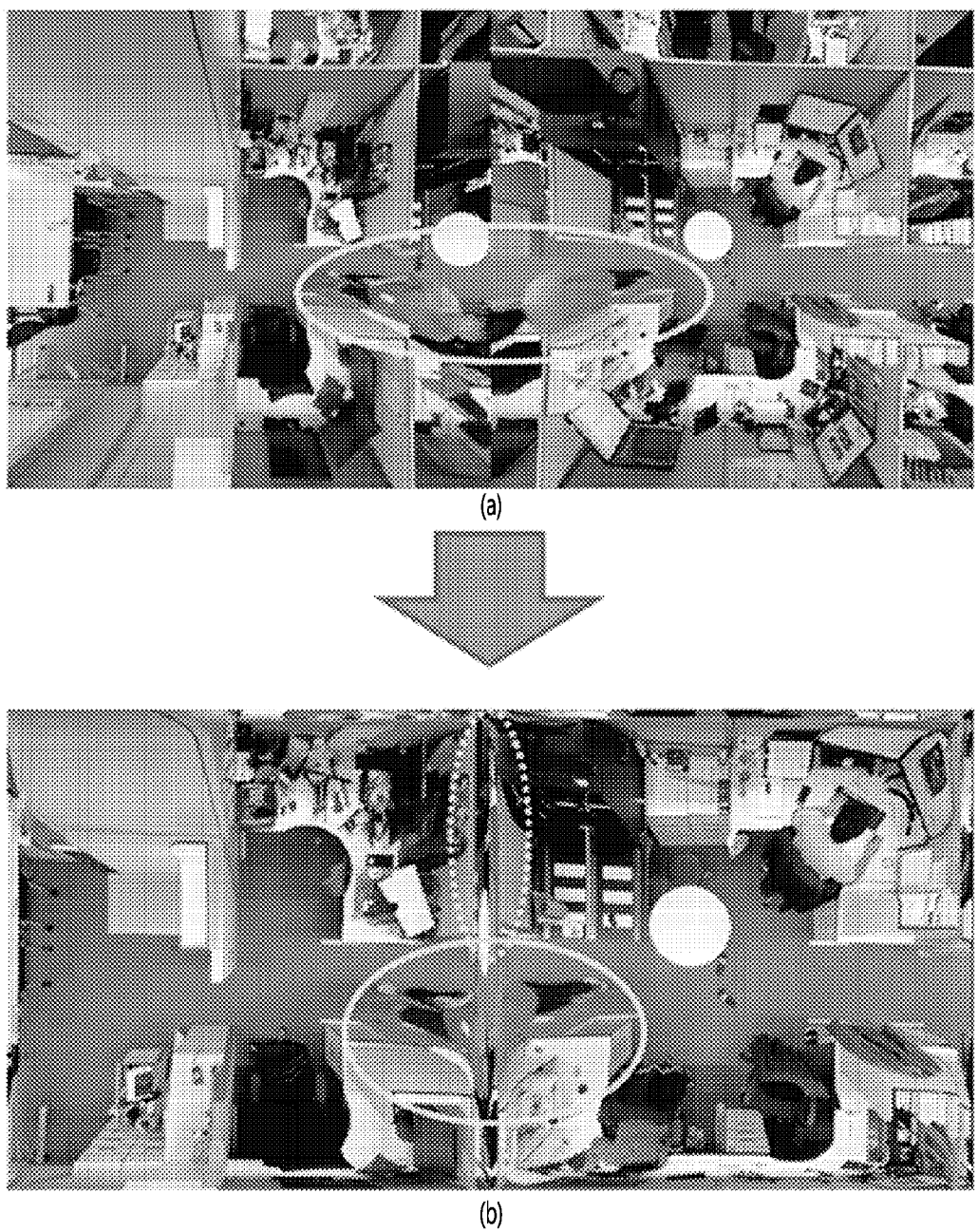
FIG. 17 is a monitoring image generated when the cameras have an interval of 4 m*4 m.

In addition, FIG. 16 is a monitoring image generated when the cameras have an interval of 3 m*3 m, and FIG. 17 is a monitoring image generated when the cameras have an interval of 4 m*4 m.

Referring to FIGS. 15 to 17, it can be seen that as the interval between the cameras increases, an object located at a boundary between the first corrected image and the second corrected image appears more unnatural.

This is because, as the angle of view corresponding to the image is wider, the overlapping region becomes larger, and there is a limit to making the objects appear as one even though the overlapping region is compressed. However, as the interval between cameras increases, the number of cameras necessary for installing decreases, which may be advantageous in terms of economics.

Meanwhile, the region to which compression is applied and the compression ratio for each region in the first image may be set so that an object located at or passing through the boundary looks as natural as possible.

For example, in the monitoring image, a region to which compression is applied and a compression rate for each region may be determined such that an object located at a boundary between the first corrected image and the second corrected image is not separated. In this case, the fact that the object appears in an unseparated form may mean that the object appears to be traceable by an object tracking technique, rather than completely reflecting the shape of the real object.

In another example, in the monitoring image, a region to which compression is applied and a compression rate for each region may be determined such that the size of the object located in the non-overlapping region of the first corrected image is equal to the size of an object (same object) located at the boundary between the first corrected image and the second corrected image. Here, the fact that objects are the same may mean that the objects are similar in size so that the objects can be tracked by an object tracking technique, regardless of whether the objects are in the non-overlapping region or the overlapping region, rather than being exactly the same in size.

Meanwhile, a video may be captured by a plurality of cameras, and a monitoring image may also be implemented as a video.

In this case, in the monitoring image, the region to which compression is applied and the compression ratio for each region may be determined such that the moving speed of the object moving in the non-overlapping region of the first corrected image is the same as the moving speed of the object moving from the first corrected image to the second corrected image. For example, it is assumed that an object (person) is moving around the indoor space while maintaining the same speed. In addition, on the monitoring image, it is assumed that the moving speed of the object moving in the non-overlapping region is 3 km/h. In this case, the moving speed of the object moving from the first corrected image to the second corrected image on the monitoring image may also be 3 km/h.

Meanwhile, the processor may perform object tracking on an object appearing in the monitoring image by using the monitoring image.

Here, object tracking may be a technique of finding an object in an image and tracking a change of the object by using similarity between characteristic information such as size, color, shape, and contour of the object in a series of image frames. Object tracking is a well-known technique and a detailed description thereof will be omitted.

Meanwhile, through the above-described process, an object such as a person appears at the boundary between the images without being cut off, appears in an unseparated form, appears in the original size of the object, and appears at the original moving speed of the object.

Therefore, according to the present disclosure, when the processor performs the object tracking using the monitoring image, there is an advantage that the poor performance of the object tracking can be prevented from occurring despite the object passing through the boundary.

In addition, according to the present disclosure, there is an advantage that can provide a more natural image to the person viewing the monitoring image.

Figure 18:
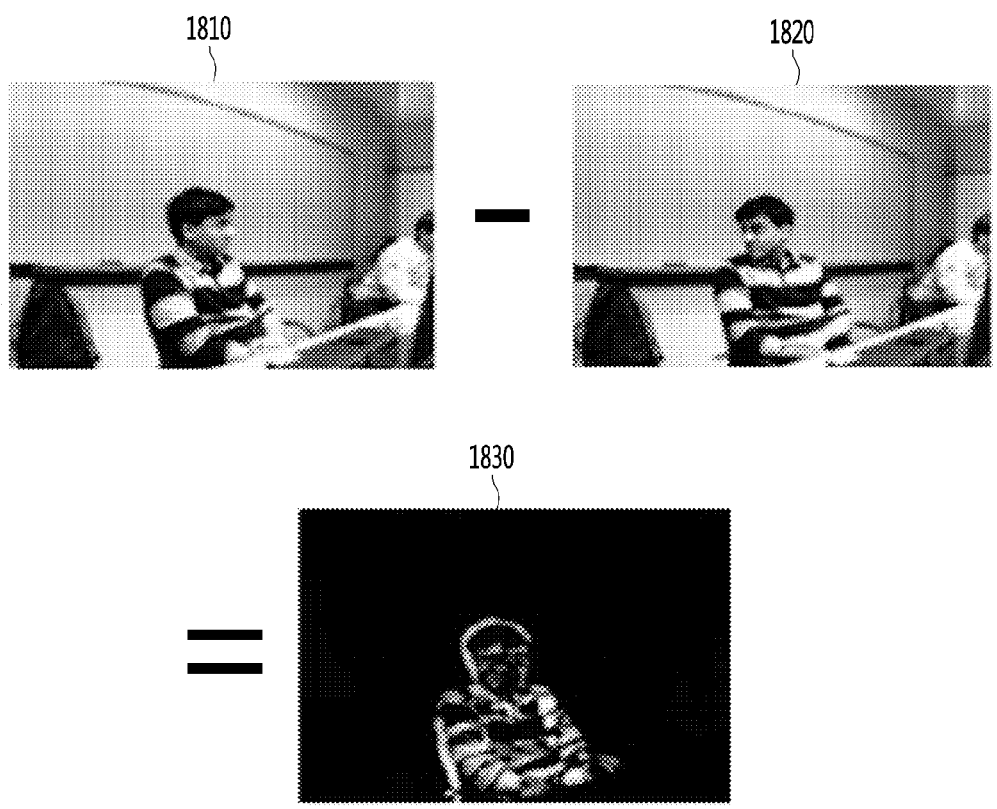
FIG. 18 is a view illustrating a problem that may be generated when object tracking is performed in a video.

FIG. 18 is a view illustrating a problem that may be generated when object tracking is performed in a video.

In indoor space, there is a need to track only people except for goods. For example, in an unattended store, display stands or merchandise are fixed, so it is necessary to grasp the movement of people by extracting and tracking only people from images.

To this end, in the related art, the movement of people has been grasped by obtaining a differential image obtained by subtracting the rear frame 1820 from the front frame 1810 of a plurality of frames of the video. In other words, since the fixed objects are not reflected on the differential image obtained by subtracting the rear frame 1820 from the front frame 1810 and only the changing (moving) objects appear, the differential image may be used for tracking the moving object.

However, when the rear frame 1820 is differentially divided from the front frame 1810 of the plurality of frames of the video, only the change value may appear around the boundary of the object or only the change value of a portion of the object may appear as in the differential image 1830. This is because when the objects of the front frame 1810 and the rear frame 1820 share the same plane, the change value for the same plane becomes 0, and only the change value for the boundary appears.

In this case, since object tracking is performed based on the outline of the object, a problem may occur that the performance of object tracking is degraded. In particular, since an object located at a boundary between images in the monitoring image does not appear clearly as a real object, performance may be further degraded when object tracking is performed in a conventional manner.

Figure 19:
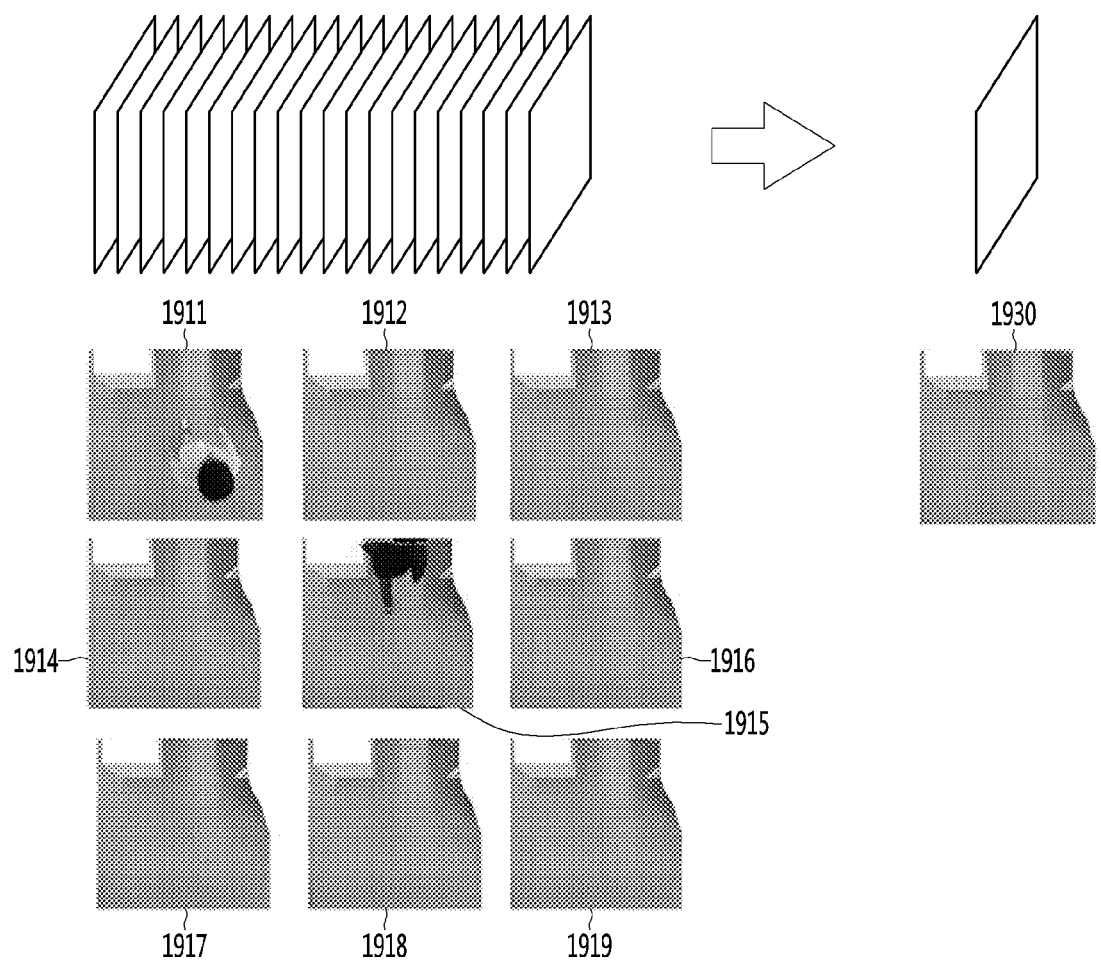
FIGS. 19 to 20 are views for describing an object tracking method according to the present disclosure.
Figure 20:
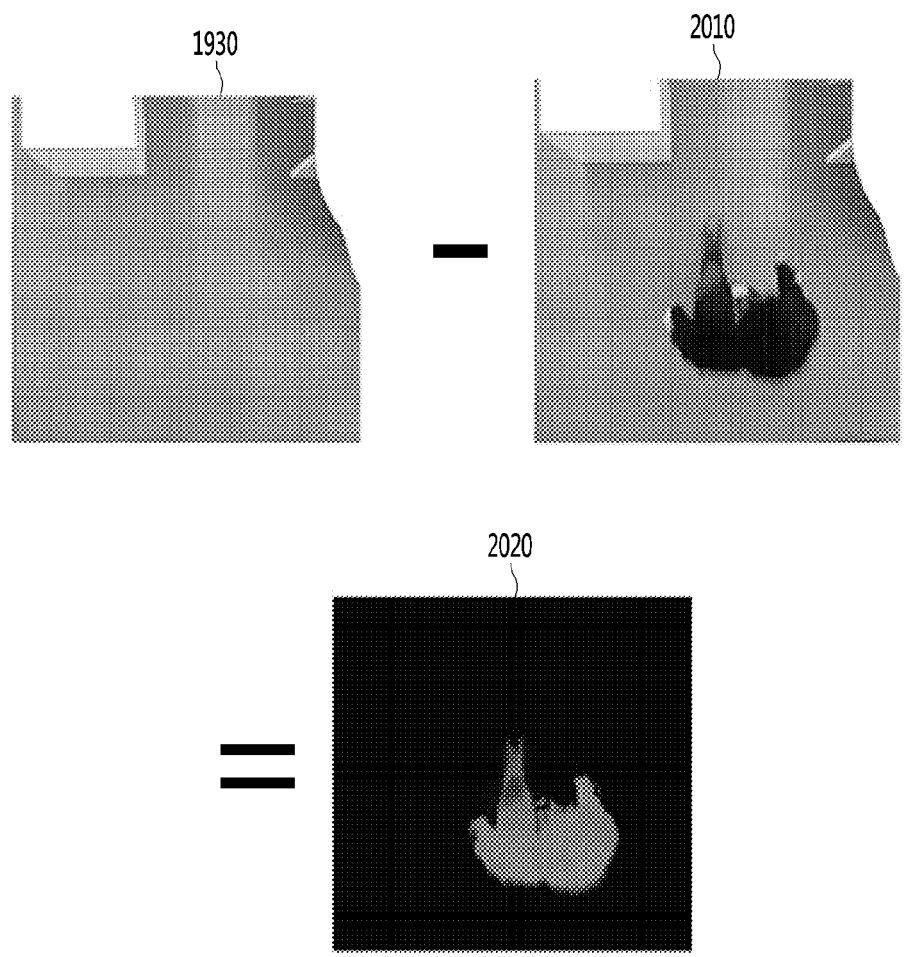

FIGS. 19 to 20 are views for describing an object tracking method according to the present disclosure.

Referring to FIG. 19, the processor may store a plurality of frames for a predetermined time of a monitoring image in a buffer.

For example, the processor may store a plurality of frames collected during three seconds of the monitoring image in a buffer.

In addition, the interval of the frames stored in the buffer can be adjusted. For example, the processor may store the first frame, the second frame, the third frame, and the fourth frame in the buffer, and may store the first frame, the third frame, the fifth frame, and the seventh frame in the buffer.

Meanwhile, the plurality of frames may be the latest frames. Specifically, when a new frame is generated, the processor may remove the oldest frame in the buffer and store the newly generated frame in the buffer.

Meanwhile, the processor may generate an average image obtained by averaging a plurality of frames 1911, 1912, 1913, 1914, 1915, 1916, 1917, 1918, and 1919 for a predetermined time of the monitoring image.

Specifically, the processor may add all the pixel values of the plurality of frames 1911, 1912, 1913, 1914, 1915, 1916, 1917, 1918, and 1919 in the buffer, and then divide the sum by the number of frames, and thus may generate an average image 1930 obtained by averaging a plurality of frames 1911, 1912, 1913, 1914, 1915, 1916, 1917, 1918, and 1919.

Meanwhile, moving objects (persons) are included in the first frame 1911 and the fifth frame 1915. Since it is averaged together with other frames 1912, 1913, 1914, 1916, 1917, 1918, 1919 that do not include a moving object (person), moving objects which is present in the first frame 1911 and the fifth frame 1915 will be diluted.

Accordingly, no moving object exists in the average image 1930 obtained by averaging the plurality of frames 1911, 1912, 1913, 1914, 1915, 1916, 1917, 1918, and 1919.

Meanwhile, in order to further clearly remove the moving object in the average image 1930, the processor can calculate the change in the color value in units of pixels, and if the change in the color value is large, the processor can exclude the corresponding value and generate an average image 1930 using the color value that appears most frequently as a representative value.

Meanwhile, referring to FIG. 20, the processor may generate an object image 2020 indicating difference of the generated average image 1930 and the current frame 2010 and perform object tracking using the object image 2020.

In detail, the average image 1930 is in a state where moving objects are removed or appear only very weakly. Therefore, when the average image 1930 and the current frame 2010 are differentially divided, not only the boundary of the object but also the change value of the surface of the object may appear as in the object image 2020. In other words, the object appearing in the object image 2020 may be completely displayed not only the boundary but also the surface.

In this case, the processor may perform object tracking by using a color distribution constituting an object appearing in the object image 2020.

In other words, since the object tracking is performed using not only the outline of the object but also the color distribution of the entire object, the performance of the object tracking is much improved.

Figure 21:
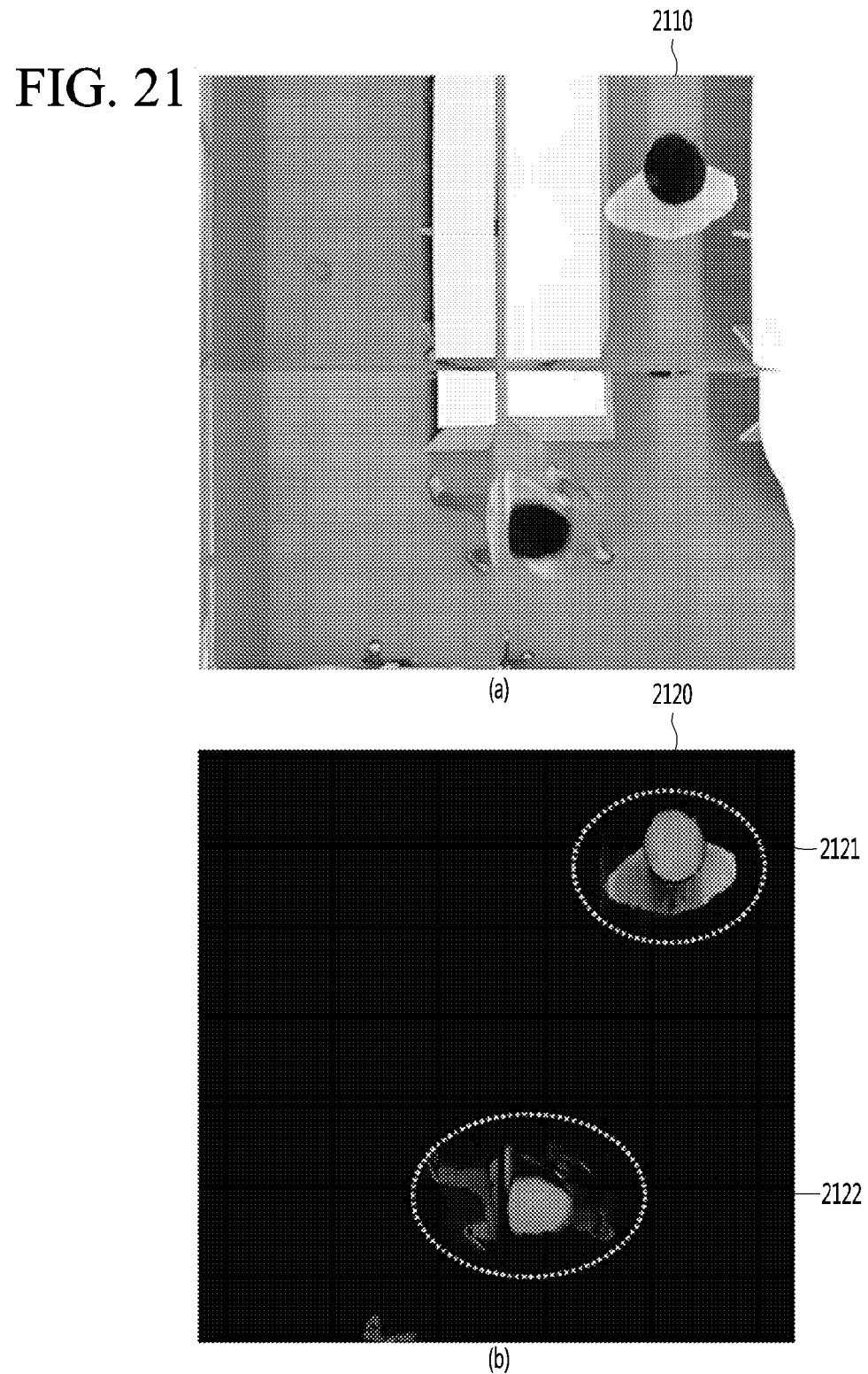
FIG. 21 is a view illustrating a monitoring image 2110 generated by capturing four images using four cameras arranged in a mesh form on the ceiling and stitching four images and an object image 2120 generated by differentially dividing the monitoring image 2110 and an average image.

FIG. 21 is a view illustrating a monitoring image 2110 generated by capturing four images using four cameras arranged in a mesh form on the ceiling and stitching four images and an object image 2120 indicating difference of the monitoring image 2110 and an average image.

Since the shape of the object 2122 located at the boundary between the images does not appear clearly like a real object, performance may be further degraded when object tracking is performed in a conventional manner (manner using a boundary).

However, if the object 2122 in the object image 2120 is looked at, not only the boundary but also the color distribution appear clearly. Therefore, according to the present disclosure, even if an object passes through the stitching region, there is an advantage that the performance of object tracking can be prevented from being lowered.

In addition, according to the present disclosure, the latest frames are stored in a buffer and an average image is generated using the latest frames. Since this means that the latest background image (images except moving objects) can be generated, the accuracy of object tracking can be improved despite the change of indoor space.

In unmanned stores, for example, there are constant changes in the environment, such as when a customer takes goods on display, when goods are dropped on the floor, or when a drink is spilled. However, according to the present disclosure, since the latest background image is extracted and the moving object is extracted by differentially dividing the latest background image and the current frame, the accuracy of object tracking can be improved.

The above-described present disclosure may be implemented as a computer-readable code on a computer-readable medium in which a program is stored. The computer readable recording medium includes all types of recording devices in which data readable by a computer system is stored. Examples of the computer-readable recording medium include hard disk drives (HDD), solid state disks (SSD), silicon disk drives (SDD), read only memories (ROMs), random access memories (RAMs), compact disc read only memories (CD-ROMs), magnetic tapes, floppy discs, and optical data storage devices. Also, the computer may include a control unit 180 of the terminal.

Therefore, the detailed description is intended to be illustrative, but not limiting in all aspects. It is intended that the scope of the present disclosure should be determined by the rational interpretation of the claims as set forth, and the modifications and variations of the present disclosure come within the scope of the appended claims and their equivalents.

What is claimed is:

1. An artificial intelligence device comprising:
   a plurality of cameras configured to capture a plurality of images, respectively, wherein the plurality of images includes at least a first image capturing, by a first camera among the plurality of cameras, a first portion of a space and a second image capturing, by a second camera among the plurality of cameras, a second portion of the space adjacent to the first portion of the space;
   a display; and
   a processor configured to:
   generate a first corrected image obtained by compressing a first overlapping region in the captured first image based at least in part on a preset reference height and by cutting a first partial region from the captured first image, wherein the first overlapping region overlaps the second captured image with respect to the first captured image;
   generate a second corrected image obtained by compressing a second overlapping region in the captured second image based at least in part on the preset reference height and by cutting a second partial region from the captured second image, wherein the second overlapping region overlaps the first captured image with respect to the second captured image, wherein the first corrected image and the second corrected image are generated such that a first angle of view corresponding to the first image and a second angle of view corresponding to the second image correspond to the preset reference height;

generate a monitoring image by associating the generated first corrected image and the generated second corrected image; and cause, on the display, a display of the generated monitoring image.

2. The artificial intelligence device of claim 1,
wherein a first compression ratio of the first overlapping region increases toward an edge of the first image, and
wherein a second compression ratio of the second overlapping region increases toward an edge of the second image.

3. The artificial intelligence device of claim 1,
wherein the first camera and the second camera have an interval determined by a first angle of view corresponding to the first camera and a second angle of view corresponding to the second camera such that the first angle and the second angle correspond to the preset reference height, wherein the interval corresponds to a distance between the first camera and the second camera.

4. The artificial intelligence device of claim 1,
wherein the plurality of cameras are arranged at regular intervals on a ceiling of the space to capture images of the space in a vertical direction such that image sensors from the plurality of cameras are positioned perpendicular to a floor, and
wherein the monitoring image corresponds to a representation of the space in a plan view.

5. The artificial intelligence device of claim 1,
wherein the monitoring image includes an object appearing in an unseparated form, wherein the object is positioned at a boundary between the first corrected image and the second corrected image.

6. The artificial intelligence device of claim 1, wherein compressing the first overlapping region and compressing the second overlapping region is based at least in part on associating a first moving speed of an object moving in a non-overlapping region of the first corrected image and a second moving speed of the object moving from the first corrected image to the second corrected image as a same speed.

7. The artificial intelligence device of claim 1,
wherein the monitoring image includes an object positioned at a non-overlapping region of the first corrected image being a same size as the size of the object positioned at a boundary between the first corrected image and the second corrected image.

8. The artificial intelligence device of claim 1, wherein the processor is further configured to perform object tracking for an object appearing in the monitoring image by using the monitoring image.

9. The artificial intelligence device of claim 8, wherein the processor is further configured to:

generate an averaged image obtained by averaging a plurality of frames for a predetermined time of the monitoring image, and generate an object image indicating a difference of the generated averaged image and a current frame, wherein the object tracking is performed using the generated object image.

10. The artificial intelligence device of claim 9, wherein the plurality of frames correspond to latest frames in the predetermined time.

11. The artificial intelligence device of claim 9, wherein the object tracking is performed by using a color distribution of an object appearing in the generated object image.

12. A method comprising:

capturing, by a plurality of cameras, a plurality of images, respectively, wherein the plurality of images includes at least a first image capturing, by a first camera among the plurality of cameras, a first portion of a space and a second image capturing, by a second camera among the plurality of cameras, a second portion of the space adjacent to the first portion of the space;

generating a first corrected image obtained by compressing a first overlapping region in the captured first image based at least in part on a preset reference height and by cutting a first partial region from the captured first image, wherein the first overlapping region overlaps the second captured image with respect to the first captured image;

generating a second corrected image obtained by compressing a second overlapping region in the captured second image based at least in part on the preset reference height and by cutting a second partial region from the captured second image, wherein the second overlapping region overlaps the first captured image with respect to the second captured image, wherein the first corrected image and the second corrected image are generated such that a first angle of view corresponding to the first image and a second angle of view corresponding to the second image correspond to the preset reference height;

generating a monitoring image by associating the generated first corrected image and the generated second corrected image; and displaying, on the display, the generated monitoring image.

13. The method of claim 12, wherein the plurality of cameras are arranged at regular intervals on a ceiling of the space to capture images of the space in a vertical direction such that image sensors from the plurality of cameras are positioned perpendicular to a floor, and wherein the monitoring image corresponds to a representation of the space in a plan view.

* * * * *